United States Patent
Kosonen et al.

(10) Patent No.: US 9,976,005 B2
(45) Date of Patent: May 22, 2018

(54) COMPOSITE STRUCTURE WITH VIBRATIONAL PROPERTIES

(71) Applicant: UPM-KYMMENE CORPORATION, Helsinki (FI)

(72) Inventors: Harri Kosonen, Lappeenranta (FI); Sami Turunen, Lappeenranta (FI); Jere Salminen, Lappeenranta (FI); Petri Myllytie, Guelph (CA); Kari Luukko, Espoo (FI); Stefan Fors, Kausala (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 482 days.

(21) Appl. No.: 14/439,829

(22) PCT Filed: Nov. 1, 2012

(86) PCT No.: PCT/FI2012/000043
§ 371 (c)(1),
(2) Date: Apr. 30, 2015

(87) PCT Pub. No.: WO2014/068166
PCT Pub. Date: May 8, 2014

(65) Prior Publication Data
US 2015/0291746 A1    Oct. 15, 2015

(51) Int. Cl.
*C08J 5/04* (2006.01)
*B29C 70/14* (2006.01)
(Continued)

(52) U.S. Cl.
CPC ............ *C08J 5/045* (2013.01); *B29C 35/0288* (2013.01); *B29C 70/14* (2013.01); *C08K 7/02* (2013.01);
(Continued)

(58) Field of Classification Search
CPC .... C08J 5/045; C08J 2300/22; C08J 2301/02; C08J 2400/22; C08J 2401/02;
(Continued)

(56) References Cited

U.S. PATENT DOCUMENTS 5,882,564 A     3/1999  Puppin
6,284,831 B1 *  9/2001  Shimpuku .................. C08J 5/10
                                                    524/492
(Continued)

FOREIGN PATENT DOCUMENTS

CN     1222877 A     7/1999
CN     1913722 A     2/2007
(Continued)

OTHER PUBLICATIONS

Feb. 1, 2016 Office Action issued in Chinese Patent Application No. 201280076844.3.
(Continued)

*Primary Examiner* — Cephia D Toomer
(74) *Attorney, Agent, or Firm* — Cantor Colburn LLP

(57) ABSTRACT

The application relates to a composition and manufacturing and a use of a composite structure having vibrational properties and to a product thereof. According to an embodiment a composition comprises a matrix material and organic natural fiber material, wherein speed of sound is arranged to be different in different directions in the composition.

20 Claims, 8 Drawing Sheets

(51) Int. Cl.
*C08K 7/02* (2006.01)
*C08L 97/02* (2006.01)
*C08L 23/12* (2006.01)
*B29C 35/02* (2006.01)
*G10K 13/00* (2006.01)
*G10K 11/16* (2006.01)
*G10K 11/18* (2006.01)
*B29K 101/12* (2006.01)
*B29K 511/14* (2006.01)
*B29L 31/38* (2006.01)
*B29L 31/00* (2006.01)

(52) U.S. Cl.
CPC .............. *C08L 23/12* (2013.01); *C08L 97/02* (2013.01); *G10K 13/00* (2013.01); *B29K 2101/12* (2013.01); *B29K 2511/14* (2013.01); *B29L 2031/38* (2013.01); *B29L 2031/758* (2013.01); *C08J 2300/22* (2013.01); *C08J 2301/02* (2013.01); *C08J 2400/22* (2013.01); *C08J 2401/02* (2013.01); *G10K 11/16* (2013.01); *G10K 11/18* (2013.01)

(58) Field of Classification Search
CPC ....... B29C 70/14; B29C 35/0288; C08K 7/02; C08L 97/02; C08L 23/12; G10K 11/16; G10K 11/18; G10K 13/00; B29K 2101/12; B29K 2511/14; B29L 2031/38; B29L 2031/758
See application file for complete search history.

(56) References Cited

U.S. PATENT DOCUMENTS

| | | | |
|---|---|---|---|
| 7,214,866 B2 † | 5/2007 | Rautia | |
| 7,443,998 B2 | 10/2008 | Hachiya | |
| 2007/0034443 A1 | 2/2007 | Tokura et al. | |
| 2008/0254236 A1 | 10/2008 | Kawanishi et al. | |
| 2010/0236695 A1 | 9/2010 | Lamontia et al. | |
| 2011/0284319 A1 | 11/2011 | Frederick et al. | |
| 2012/0064285 A1 | 3/2012 | Mathur | |
| 2012/0263965 A1 | 10/2012 | Persson et al. | |

FOREIGN PATENT DOCUMENTS

| | | |
|---|---|---|
| DE | 100 05 699 A1 | 8/2001 |
| EP | 2223785 A2 | 9/2010 |
| JP | 01278198 | 8/1989 |
| JP | 01278198 A | 8/1989 |
| JP | 2004320670 A | 11/2004 |
| JP | 2005067064 A | 3/2005 |
| JP | 2007051405 A | 3/2007 |
| JP | 2008096637 A | 4/2008 |
| JP | 2008160360 A | 7/2008 |
| JP | 2008299201 A | 11/2008 |
| JP | 2009516032 A | 4/2009 |
| WO | 97/49533 A1 | 12/1997 |

OTHER PUBLICATIONS

Oct. 22, 2013 International Search Report issued in Application No. PCT/FI2012/000043.
Oct. 22, 2013 Written Opinion issued in Application No. PCT/FI2012/000043.
Feb. 27, 2015 International Preliminary Report on Patentability issued in Application No. PCT/FI2012/000043.
Japan Office Action for Japanese Patent Application No. 2015-540184; OA Transmission dated Jan. 17, 2017; 3 pages; Non-English Translation.
Japan Office Action for Japanese Patent Application No. 2015-540184; OA Transmission dated Jan. 17, 2017; 4 pages; English Translation.
Third Part Observation for EP Application No. 20120887460; Mailed on Aug. 29, 2017; 5 pages.

\* cited by examiner
† cited by third party

COMPOSITE STRUCTURE WITH VIBRATIONAL PROPERTIES

FIELD OF THE INVENTION

This application relates to a composition and manufacturing and a use of a composite structure having vibrational properties and to a product thereof.

BACKGROUND

Polymer composites can be used to manufacture products for various industrial applications. In many environments, it may be useful for the product to have specific properties. In some applications it may even be necessary that the product meets the quality levels set for the application to function. Some composite products typically comprise wood material and at least one kind of plastic polymer. Such composite products may be used for several purposes, both indoors and outdoors.

SUMMARY

An object of the present application is to provide composite structure having acoustic properties. According to embodiments the acoustic properties may be adapted to be usable for desired purposes, like strengthening or attenuation of sound.

Polymer composites comprising organic natural fiber material may comprise acoustic properties. A composite product may comprise a surface zone which may comprise aligned fiber components of organic natural fiber material.

According to at least one or some embodiments properties, like resistance to moisture, stiffness, anisotropic speed of sound or vibration dampening, may be achieved.

According to an embodiment composition comprises a matrix material and organic natural fiber material, wherein speed of sound is arranged to be different in different directions in the composition. According to an embodiment method for producing said composition is disclosed. According to at least some embodiments the speed of sound has difference of at least 10% in different directions.

According to another embodiment a method for providing a composite comprises providing a matrix material and organic natural fiber material, wherein speed of sound is different in different directions in the composition.

In one example, the component according to an embodiment is used as acoustic material.

In one example, the component according to an embodiment is used at least as part of a loudspeaker.

In one example, the component according to an embodiment is used as a panel of a loudspeaker and/or as a cone of a loudspeaker.

In one example, the component according to an embodiment is used at least as a part of a musical instrument.

In one example, the component according to an embodiment is used for attenuation of sound.

In one example, the component according to an embodiment is used for strengthening sound.

In one example, the component according to an embodiment is used as part of a vehicle for attenuating and/or damping sound.

According to an example, a loudspeaker comprises composition according to at least some of the embodiments.

According to an example, a sound absorbing panel comprises composition according to at least some of the embodiments.

According to an example, an electric device comprises composition according to at least some of the embodiments.

According to an example, a musical instrument comprises composition according to at least some of the embodiments.

According to an example, a building block comprises composition according to at least some of the embodiments.

DESCRIPTION OF THE DRAWINGS

The following figures are illustrative representations of example embodiments of the invention.

DETAILED DESCRIPTION

Figure 1A:
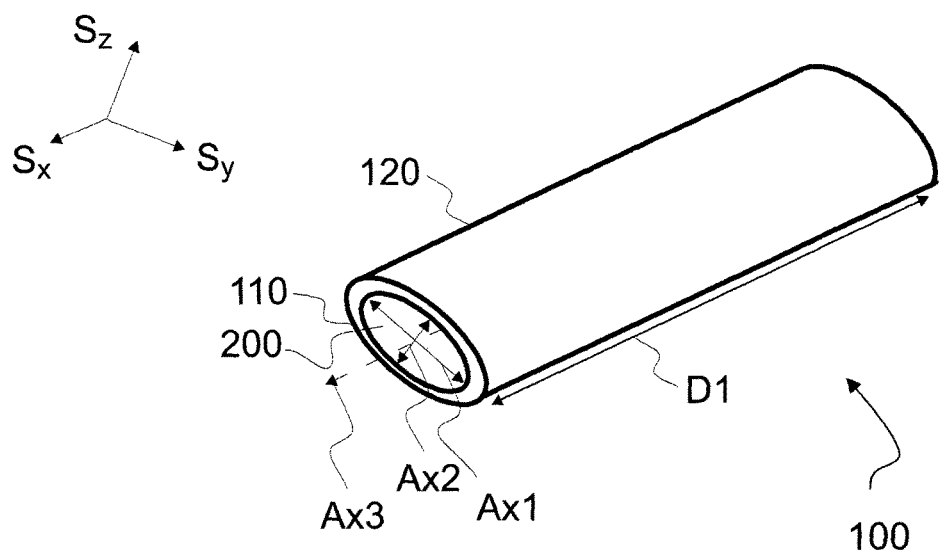
FIG. 1a illustrates a fiber component of organic natural fiber material according to an example embodiment. The figure is not in any particular scale, and is meant to be an illustrative representation.

Humans are perceptive to various types of mechanical vibrations. When the mechanical vibration falls into a specific frequency range, it may be heard as an audible sound. Sound is an elemental part of our lives. Sound may be melodic, such as music created by instruments. A human voice is also a sound. In a variety of applications the acoustical properties of a product may play an important role. A product may be designed to attenuate or dampen out noise. Examples of such products may be insulating or isolating panels, such as those used in the hull of an automobile or a meeting room to create a quiet environment. Alternatively, some products may be designed to reproduce a previously recorded sound. Examples of such products may be audio systems using loudspeakers or ear phones. For example, music or voice may be recorded, digitized and later reproduced by a receiver equipped with an audio system. The acoustical properties of a product may depend at least to some extent of the materials used in the product.

Polymer composites comprising organic natural fiber material may provide a way to manufacture structures for various applications with acoustical properties. Polymer composites comprising organic natural fiber material may comprise many applications both outdoors and indoors, a non-limited exemplary listing including decking boards, construction materials, decorative items, frames, panels, facades, flooring, fencing, decking, stairs, rails, window frames, trims, pallets, containers, household articles, automotive parts, vehicle accessories, and the like.

In particular, the polymer composites comprising organic natural fiber material may be used in applications where the acoustical behaviour of a material has an effect. For example, a door panel made for automobile industry may need to be light to avoid increasing the determined total weight of the system. However, the same object may need to be sufficiently strong to bear a designated load or to sustain a predetermined impact strength. The object may in addition have an acoustic purpose to attenuate noise. A composite item made for electronics industry, such as a component in an audio system, may need to provide acoustic properties which reproduce the recoded sound with high quality. Furthermore, there may be a desire to differentiate the component according to customer preferences, for example by selecting the colour of the object.

The following text describes a method to produce composite structure comprising organic natural fiber with acoustic properties. In addition, a method to control the acoustic properties of a composite is presented. Furthermore, examples and applications for composite structures comprising organic natural fiber material with acoustic properties are presented.

In the text, reference is made to the figures with following numerals and denotations.

$S_X$, $S_Y$ and $S_Z$ denote orthogonal directions.
D1 length (longitudinal dimension) of a fiber component
D2 width (horizontal dimension) of a fiber component
D3 height (vertical dimension) of a fiber component
D4 distance
α1 deviation angle
β1 deviation angle
v1 velocity
$f_m$ melt flow direction
Ax1 major axis of a fiber component
Ax2 minor axis of a fiber component
Ax3 longitudinal axis of a fiber component
N1 surface normal
cp1 point
100 fiber component
100' fiber component (horizontal)
100" fiber component (vertical)
104 mould surface
105 first surface (of a composite structure)
105' second surface (of a composite structure)
110 cross-section
120 shell layer
130 first surface zone
131 second surface zone
132 interior zone
133 first interface
134 second interface
140 thickness of the composite structure
160 mould
200 hollow interior
250 composite structure
300 sound wave
301 reflected sound wave
302 absorbed/transmitted sound wave
1110 first surface interface
1110' second surface interface
1102 first zone
1000 second zone
1120 third zone
900 audio system
910 panel
920 driver
925 cone
930 enclosure
940 interior
1200 element
1210 first panel
1220 second panel
1230 interface The embodiments of the present invention may have an effect on the acoustic properties of the composite structure. The composite structure comprising organic natural fiber material may have the effect of achieving desired acoustic properties. According to an embodiment a fiber orientation in a composite structure may be controlled in order to achieve desired acoustic properties. The embodiments are presented as illustrative examples, and they should not be considered limiting.

A polymer composite comprising organic natural fiber material in this context refers to a composition which comprises two or more material components combined together, wherein the constituents can retain their identity. At least one of the main components is organic natural fiber material and another of the main components is a matrix material. Optionally, other additives such as colorants, ultraviolet degradation inhibitors; anti-fungicidal components; anti-microbial components, inorganic fillers or other components may be blended into the composite during the manufacturing process. The main components of a composite may not dissolve or otherwise merge completely with each other. The properties of the composite may differ from the properties of the main components acting alone. Mechanical properties of composite products depend on many aspects. For example, if the product comprises fiber materials and polymers, fiber type, fiber properties, fiber content, fiber length, dispersion, and adhesion between fibers and matrix material have an effect on mechanical properties of the product.

The stiffness of the composite product may increase if fiber materials are added to the matrix material. For example, wood and wood based cellulose fibers are typically quite short, but they may still increase stiffness and strength quite a lot.

In this context, the terms "organic natural fiber material" refer to particles, such as fibers or fiber-like particles, that contain cellulose. In other words, the organic natural fiber material can originate from any plant material that contains cellulose, i.e. both wood material and non-wood material can be used.

Preferably the organic natural fiber material is, at least partly, in the form of fibers. Preferably at least 40 wt. % or at least 50 wt. %, more preferably at least 60 wt. % or at least 70 wt. % and most preferably at least 80 wt. % of the organic natural fiber materials are in the form of fibers. In this application, the organic natural fiber material having a length of at least 0.1 mm, more preferably at least 0.2 mm and most preferably at least 0.3 mm are called fibers, and smaller particles than those mentioned above are called powder or fiber-like particles. Preferably at least 70%, at least 80% or at least 90% of the organic natural fiber material has a length weighted fiber length of under 4 mm, under 3 mm or under 2.5 mm, more preferably under 2.0 mm, under 1.5 mm, under 1.0 mm or under 0.5 mm. Preferably, at least 70%, at least 80%, or at least 90% of the organic natural fiber material has a length weighted fiber length of at least 0.1 mm or at least 0.2 mm, more preferably at least 0.3 mm or at least 0.4 mm. Advantageously, the fiber has a shape ratio relating to the ratio of the fiber length to the fiber thickness being at least 5, preferably at least 10, more preferably at least 25 and most preferably at least 40. In addition or alternatively, the fiber has a shape ratio relating to the ratio of the fiber length to the fiber thickness being preferably 1500 at the most, more preferably 1000 at the most, and most preferably 500 at the most. High shape ratio relates to reinforcing component with higher stiffness and impact strength for the same organic natural fiber material content. This can be described by modulus, for example Young's modulus or modulus of elasticity, which is a measure of the stiffness of a material and is used to characterize materials. The organic natural fiber material may comprise reinforcing components in the structure.

The organic natural fiber material can be in the form of fibers, such as floccules, single fibers, or parts of single fibers, or the organic natural fiber material can be in the form of fiber-like particles, such as saw dust or grinded material, where the material does not have exactly spherical form, but the longest dimension of particle is less than 5 times longer than the smallest dimension.

Advantageously, the organic natural fiber material comprises fibers in a flake form. Flakes are fibers having a width that is at least 2 times larger than the thickness of the fibers. Advantageously, the width of the flake is at least 2, preferably at least 2.5, and more preferable at least 3 times the thickness of the flake. Preferably, the flakes have a thickness between 1 micron and 30 micrometers and more preferably the thickness of flakes varies from 2 microns to 20 micrometers. Most preferably the thickness of flakes is under 15 µm, more preferable under 10 µm and most preferable under 7 µm. In one embodiment, the width of the flake is under 500 µm, preferably under 200 µm, and more preferable under 50 µm. Preferably, an aspect ratio relating to the ratio of the length to the width is between 10 and 100. Preferably, an aspect ratio relating to the ratio of the length to the thickness is less than 1500 or less than 1000, more preferable less than 500 and most preferably between 25 and 300. In one embodiment, the length of the flake is at least 10 times the width of the flake. In one embodiment the flake has a tabular shape. In one embodiment the flake has a platy shape. In one embodiment, the organic natural fiber material contains flake-form fiber material at least 30 dry wt. %, preferably at least 50 dry wt. % and more preferable at least 70 dry wt. % of the total amount of the organic natural fiber material.

The organic natural fiber material may comprise mechanically treated and/or chemically treated fibers and/or fiber-like particles. The treated particles used may comprise at least 30 wt. % or at least 40 wt. %, more preferably at least 50 wt. % or at least 60 wt. %, and most preferably at least 80 wt. % or at least 90 wt. % of mechanically treated organic natural fiber material.

The term "mechanically treated" may refer to organic natural fiber material, which is isolated from any organic natural raw material comprising cellulose by a mechanical pulping process. The mechanical pulping process could be preceded by a chemical pretreatment, producing chemimechanical pulp. The mechanically treated organic natural fiber material may be, for example, ground, refined and/or powdered from the source used. In other words, the source of the organic natural fiber material may be mechanically treated but not chemically treated. The mechanically treated organic natural fiber material may comprise, among other things, wood flour, saw dust, chip material, and/or mechanical pulp such as TMP (thermo mechanical pulp), GW (groundwood pulp)/SGW (stone groundwood pulp), PGW (pressure groundwood pulp), RMP (refiner mechanical pulp), and/or CTMP (chemithermomechanical pulp). The mechanically treated organic natural fiber material preferably comprise or consist of wood particles, such as wood fibers, but they may also comprise or consist of non-wood material. The mechanically treated organic natural fiber material may comprise recycled and/or virgin particles, such as fibers or fiber-like particles. For example, at least 30 wt. % or at least 40 wt. %, more preferably at least 50 wt. % or at least 60 wt. %, and most preferably at least 80 wt. % or at least 90 wt. % of the organic natural fiber material used may be virgin. For example, a wood plastic composite (WPC) may comprise the saw dust or at least other mechanically treated wood or plant particles as main organic natural fiber material. Mechanically treated organic natural fiber material typically comprises lignin. In mechanically treated organic natural fiber material, such as cellulose based fibers, lignin is present in various amounts, but typically in higher amounts than in chemically treated organic natural fiber material. Lignin is a highly polymeric material, able to crosslink and may act as a water repellent in a cellulose based fiber plastic composite. For example in wood cells the presence of lignin limits the penetration of water into the wood cells, which makes the structure very compact. Organic natural fiber material comprising lignin, however, is prone to decompose (burn) more easily in high temperatures than fiber material free of lignin.

The chemically treated organic natural fiber material preferably comprises chemical pulp. The chemical pulp may be, for example, from kraft process or sulfite process, but also other chemical processes may be used, such as a soda pulping process. Preferably, the chemical pulp is from the kraft process. The chemically treated organic natural fiber material preferably comprises or consists of wood based cellulose, but it may also be non-wood material. The chemically treated organic natural fiber material may comprise recycled and/or virgin fibers and/or fiber-like particles. Advantageously, at least 30 wt. % or at least 40 wt. %, more preferably at least 50 wt. % or at least 60 wt. %, and most preferably at least 80 wt. % or at least 90 wt. % of the organic natural fiber material used is chemically treated particles. Advantageously, at least 30 wt. % or at least 40 wt. %, more preferably at least 50 wt. % or at least 60 wt. %, and most preferably at least 80 wt. % or at least 90 wt. % of the chemically treated particles used are from kraft process. Advantageously, the pulp production method for organic natural fiber based material comprising cellulose is based on sulfate cooking, also called as kraft cooking or pulping, which uses a mixture of sodium hydroxide (NaOH) and sodium sulfide ($Na_2S$). Advantageously, lignin content of the chemically treated pulp is under 15 wt. %, preferably under 10 wt. % or under 5 wt. %, more preferably under 3 wt. %, under 2 wt. % or under 1 wt % and most preferably under 0.5 wt. %. Preferably, the alfa cellulose content of the chemically treated pulp is above 50 wt. %, preferably above 60 wt. %, more preferably above 70 wt. % and most preferably above 72 wt. % or above 75 wt. %. Advantageously, the alfa cellulose content of the chemically treated pulp is below 99 wt. %, preferable below 90 wt. %, more preferably below 85 wt. % and most preferably below 80 wt. %.

The wood material can be softwood trees, such as spruce, pine, fir, larch, douglas-fir or hemlock, or hardwood trees, such as birch, aspen, poplar, alder, eucalyptus, or acacia, or a mixture of softwoods and hardwoods. Non-wood material can be agricultural residues, grasses or other plant substances such as straw, coconut, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo, or reed. In an advantageous example, at least 30 w-% or at least 40 w-%, more preferably at least 50 w-% or at least 60 w-%, and most preferably at least 80 w-% or at least 90 w-% of the organic natural fiber material used is wood based.

The organic natural fiber material may be, at least partly, in the form of paper sheet or web, board sheet or web or pulp sheet or web, or compacted fiber matrix or pieces of compacted fibers and their combinations.

The organic natural material may be, at least partly, in the form of large fiber or fiber bundles, paper chaff, pulp chaff, crushed pulp material, derivates thereof and their combinations.

The regenerated organic natural fiber material preferably comprises dissolving pulp. Viscose, which can be manufactured from dissolving pulp, is an example of a regenerated organic natural fiber material. Fibers made of cellulose carbamate or fibers regenerated at least partly to organic natural fiber material from the carbamate and containing silicon dioxide in their structure can be used in similar applications as viscose. These regenerated fibers may further be modified, for example by chemical treatment, to produce materials which are suitable for manufacturing of polymer composites comprising organic natural fiber based material. The regenerated organic natural fiber material refers to man-made fibers.

The amount of the organic natural fiber material is calculated as the total amount of the untreated and/or in the above-mentioned way mechanically treated, and/or in the above-mentioned way chemically treated organic natural fiber material in the system or product, and advantageously does not comprise man-made fibers, such as viscose fibers.

The organic natural fiber material may comprise recycled material, for example raw material pulp of recycle streams of wood materials. The recycled material may for example comprise recycled paper material.

Inorganic fillers, such as glass fibers, carbon fibers, talc, mica, kaolin, calcium carbonate, and the like, may be included as an optional supplement to the organic natural fiber. In addition, other organic fillers, including any suitable polymeric fiber, may also be used.

In this application, the "matrix material" is preferably material which can be several times formed into a new shape when it is heated. This material keeps its new shape after cooling and then it flows very slowly, or it does not flow at all. The matrix material has at least one repeat unit, and molecular weight of the matrix material is over 18 g/mol, preferably over 100 g/mol, over 500 g/mol, or over 1000 g/mol, more preferably over 10 000 g/mol or over 100 000 g/mol.

The matrix material preferably comprises thermoplastic material; hence, the matrix material includes thermoplastic components. Advantageously, the amount of the thermoplastic material in the matrix material is at least 80 wt. %, more preferably at least 90 wt. %, and most preferably at least 95 wt. %. Advantageously, the matrix material comprises at least one crystalline polymer and/or at least one non-crystalline polymer, and/or at least one crystalline oligomer and/or at least one non-crystalline oligomer and/or at least one semi-crystalline polymer and/or at least one semi-crystalline oligomer.

A thermoset polymer material may be used as an alternative to thermoplastic polymer material in a polymer matrix. Examples of thermosetting polymers materials may be epoxy resins, unsaturated polyesters, phenolic resins, amino resins and polyurethane. Composites comprising thermosetting polymers may be perceived as difficult to recycle, which favors the use of thermoplastic polymers in manufacturing polymer composites comprising organic natural fiber material. However, the ease of use and properties of the thermosetting polymers may be beneficial when manufacturing large volumes of products for some applications, such as for the automotive industry.

Advantageously, the matrix material comprises thermoplastic polymer based matrix material and/or thermoplastic oligomer based matrix material. Thermoplastic polymers are often solid at the low temperature and they form viscose polymer melt at the elevated temperatures. Typically the viscosity of these polymer decreases when temperature is increased, and the polymers flow and wet the surfaces more easily. When thermoplastic composites are produced, polymer is heated in order to melt the polymer, and other components of the composites are mixed with the polymer melt. Often it is easy to mix these other components into polymer when the viscosity of the polymer is low, meaning that the temperature of the polymer melt is high.

The matrix material is, at least partly, in melt form, when
  the organic natural material can adhere to the matrix material, and/or
  the melt flow index of the material can be measured (according to standard ISO 1133 (valid in 2011)), and/or
  the organic natural fiber material can adhere to the surfaces of matrix material particles.

The polymer based matrix material contains one or more polymers, and the oligomer based matrix material contains one or more oligomers. The total amount of the polymers and oligomers calculated from the total amount of the matrix material is preferably at least 80 wt. %, at least 85 wt. %, at least 90 wt. %, at least 95 wt. % or at least 98 wt. %.

The matrix material used in polymer composites comprising organic natural fiber material may be a polyolefin. The polymer matrix may comprise, for example, a homopolymer, a copolymer or a modified polymer of unsaturated aliphatic hydrocarbons. Polymers, which may be used in polymer composites comprising organic natural fiber material may comprise, for example, polyethylene, polypropylene, polystyrene, polyamides, polyesters, and combinations thereof. Among the preferred polyolefins are C2-C4 polyolefins, polyethylene and polypropylene being most preferred due to their recyclability. Polyethylene and polypropylene are also available in high purity grades without process interfering residues.

If the matrix material comprises polymer, it may be any suitable polymer or polymer composition. Advantageously, the matrix material contains at least 50 wt. %, at least 60 wt. %, more preferably at least 70 wt. %, or at least 80 wt. %, and most preferably at least 90 wt. % or at least 95 wt. %:
polyolefin, e.g. polyethylene and polypropylene,
polystyrene,
polyamide,
polyester,
ABS (acrylic nitrile butadiene styrene copolymer),
polycarbonate,
biopolymer, e.g. polylactide,
biodegradable polymer,
bio-based polymer,
thermoplastic elastomer,
polysaccharides,
lignin, and/or
their derivatives.

The matrix material may contain one or more polymer material components. Advantageously, at least one polymer is selected from the group consisting of polyethylene, polypropylene and their combinations. Advantageously, the amount of polypropylene and polyethylene in the matrix material is at least 50 wt. %, at least 60 wt. %, at least 70 wt. %, at least 80 wt. %, at least 90 wt. % or at least 95 wt. %.

Advantageously, the melting point of the matrix material is under 250° C., preferably under 220° C., and more preferable under 190° C. Advantageously, the glass transition temperature of the matrix material is under 250° C., preferably under 210° C., and more preferable under 170° C.

Advantageously, melt flow rate, MFR, of the matrix material is under 1000 g/10 min (230° C., 2.16 kg defined by ISO 1133, valid 2011), more preferable 0.1-200 g/10 min, most preferable 0.3-150 g/10 min. Advantageously, melt flow rate, MFR, of the matrix material is over 0.1 g/10 min (230° C., 2.16 kg defined by ISO 1133, valid 2011), more preferable over 1 g/10 min, most preferable over 3 g/10 min.

A suitable thermoplastic polymer retains sufficient thermoplastic properties to allow melt blending with organic natural fiber material and permits effective formation of the formed composite into shaped articles by the used production method. The production can be done by a number of methods, extrusion, injection molding, compression molding, foaming or the like being example techniques. Minor amounts of thermosetting resins or other residues, such as polyurethane, may be present in the polymer compositions without sacrificing the thermoplastic properties. A thermoplastic polymer is generally a long chain polymer that may be either amorphous in structure or semi-crystalline. Thermoplastic polymers may be processed by a number of methods, such as extrusion or injection moulding, for example.

Inorganic fillers may be added in order to increase the stiffness properties of the product. The amount of the inorganic fillers in the composite comprising organic natural fiber material may preferably be between 0 and 25 w-% or 1-20 w-%. The inorganic fillers preferably consist mostly of talc and/or calcium carbonate and/or fly ash and/or mica and/or glass-filler (i.e. at least 50 w-% from the fillers). The composite comprising organic natural fiber material may be coloured, for example, by using pigments. Therefore, the composite comprising organic natural fiber material may comprise colors.

Acoustic properties of a material play a key role in many applications. The mechanical vibrations that can be interpreted as sound may be transmitted as longitudinal waves. Through solids, however, sound may be transmitted as both longitudinal waves and transverse waves. Transverse sound waves in solids are waves of alternating shear stress at right angle to the direction of propagation. In solid materials the medium may be periodically displaced by a sound wave, and thus made to oscillate. Sound may be characterized by the frequency, wavelength, amplitude, intensity and speed in different materials.

The acoustic properties between materials may differ. Table 1 presents typical speed of sound in some materials.

TABLE 1

Speed of sound in some materials.

| Material | Speed of sound, m/s | Direction |
|---|---|---|
| Steel | 5900 | Isotropic |
| PC | 2270 | Isotropic |
| PVC | 2300 | Isotropic |
| PP | 2500 | Isotropic |
| PA6 | 2600 | Isotropic |
| Rubber | 1900 | Isotropic |
| HDPE | 2400 | Isotropic |
| LDPE | 2000 | Isotropic |
| PS | 2300 | Isotropic |
| Wood | 3300-3600 | Direction of wood grain |
| Brass | 3500 | Isotropic |

The speed with which sound travels through a material may in general be defined as the root of the material's Young's modulus divided by the material's density. The speed of longitudinal waves in a material may also characterize the transverse vibrational frequencies. Impedance of a material refers to the product of the material's speed of sound and its density. The speed of sound is therefore directly related to the modulus of elasticity and density.

The speed of sound in a material may propagate in more than one direction. Table 1 shows that in plastic materials, the speed of sound in general is isotropic. In other words, the sound propagates in the material substantially at the same speed in every direction.

Depending of the material, the speed of sound in a material may be directionally dependent. In other words, the material may have anisotropic acoustic behavior. In wood, for example, the speed of sound may be roughly independent of wood species, but varies in the direction of the wood grain. The speed of sound in direction across the wood grain may be as low as one third of the speed of sound in the direction of the grain.

Further, wooden material may exchange moisture with air. Material properties that are critical for the acoustical performance of a wood such as density, Young's modulus, damping, and shrinkage are highly dependent upon the wood's moisture content. In wood, the speed of sound may be directly related to the modulus of elasticity and density. Anisotropy of wood is useful especially in instrument manufacturing.

According to an embodiment the specific modulus was measured as a function of natural fiber content. Polypropylene and soft wood cellulose (kraft pulp) was used as a main raw materials and 5% of coupling agent was added to the composite. Density and tensile modulus increased as a function of cellulose weight percent, but because the tensile modulus increase faster than the density, the specific modulus increased over 140 percent. Table 4 presents the properties of some composite materials comprising natural organic fiber material.

TABLE 4

Properties of some composite materials comprising natural organic fiber material, where the amount of organic natural fiber material (a) In the samples was 20, 30, 40, or 50 w-%.

| Sample | Fiber content wt.-% | Density g/cm$^3$ | Tensile modulus MPa | Specific Moludus MPa/g/cm$^3$ |
|---|---|---|---|---|
| a, 20% | 20 | 0.97 | 1800 | 1856 |
| a, 30% | 30 | 1.02 | 2900 | 2843 |
| a, 40% | 40 | 1.07 | 3900 | 3645 |
| a, 50% | 50 | 1.12 | 5000 | 4464 |

By chancing polymer can the specific modulus further be fine-tuned.

The specific modulus of a composite material comprising natural organic fiber material may be above 800 MPa/g/cm$^3$. For example, the specific modulus of a composite material comprising natural organic fiber material may be above 1300 MPa/g/cm$^3$ or 1900 MPa/g/cm$^3$. In some applications the specific modulus of a composite material comprising natural organic fiber material may be above 2500 MPa/g/cm$^3$ or above 3500 MPa/g/cm$^3$, advantageously above 4500 MPa/g/cm$^3$, and preferably above 5000 MPa/g/cm$^3$ or above 6000 MPa/g/cm$^3$.

In composite materials comprising natural organic fiber material the absorption of moisture may be smaller than in wooden material. This may be advantageous, for example, in applications where the product may be exposed to humidity but the acoustic properties of a product are desired to be stable. In particular, a composite product may include the organic natural fiber material 40-60 w-%, and said example of a dry composite product may absorb moisture under 1.5% from the weight of the composite product in the time of 30 hours (50% RH and 22° C. atmosphere). Alternatively, the composite product may comprise organic natural fiber material 20-40 w-%, and said example of a dry composite product may absorb moisture under 1.3% from the weight of the composite product in the time of 30 hours (50% RH and 22° C. atmosphere). The moisture uptake from the atmosphere may be measured from the dry composite products. Before the measurement the composite products may be dried. For example, the composite product may be dried at temperature of 120° C. for 48 hours before the measurement. Table 3 presents moisture contents for composite material comprising natural organic fiber material 20 w-%, 30 w-%, 40 w-%, or 50 w-%, and comprising high or lower density.

TABLE 3 moisture w-% of composite material comprising natural organic fiber material 20 w-%, 30 w-%,, 40 w-%, or 50 w-%, and comprising high or lower density.

| h | High density Fiber 50% | High density Fiber 40% | Lower density Fiber 20% | Lower density Fiber 30% | Lower density Fiber 40% |
|---|---|---|---|---|---|
| 0 | 0.00 | 0.00 | 0.00 | 0.00 | 0.00 |
| 0.5 | 0.04 | 0.08 | 0.06 | 0.06 | 0.11 |
| 1 | 0.09 | 0.1 | 0.07 | 0.07 | 0.14 |
| 2 | 0.15 | 0.12 | 0.08 | 0.09 | 0.18 |
| 3 | 0.2 | 0.13 | 0.09 | 0.1 | 0.2 |
| 4 | 0.24 | 0.15 | 0.09 | 0.11 | 0.23 |
| 5 | 0.28 | 0.17 | 0.1 | 0.11 | 0.25 |
| 6 | 0.32 | 0.18 | 0.11 | 0.12 | 0.27 |
| 30 | 0.72 | 0.35 | 0.18 | 0.22 | 0.56 |

Interfaces between materials in general have an effect on a sound in solid materials. Materials may have different density or viscosity, which may attenuate a sound Changes in viscosity or density may change the rate at which a sound may be attenuated. When sound is moving through a material that does not have constant physical properties, it may be refracted. Refraction may be either dispersing or focusing.

Density and the modulus of elasticity and of a material may be used to describe characteristic impedance. Characteristic impedance refers to vibratory energy that may be transmitted from one medium with a first impedance to another with a second impedance. For example, in a musical instrument the impedance from a first material may change when propagating into a second material.

Loss coefficient refers to the dissipation of some of the mechanical energy of vibration as heat by internal friction quantifies the damping of vibration due to internal friction, is independent of density and Young's modulus.

As described above, the behavior of sound propagation may be affected by some physical factors of the material, such as the relationship between density and pressure or the viscosity of the material.

Thermal expansion is a feature specific to materials. Each material has a specific thermal expansion coefficient, which determines how much the dimensions of the material may change as a function of temperature. In musical instruments this feature may be used to select the materials to obtain desired sound properties for an instruments. For example, in general the thermal expansion of wood may be smaller than the thermal expansion of metal. In general the thermal expansion of plastic may be larger than the thermal expansion of metal. In particular, by selecting the ratio of matrix material and organic natural fiber material, a composite comprising organic natural fiber material may designed with a specific thermal expansion coefficient. This coefficient may be selected to have a value equal to another material. Such material could be, for example, a metal or another composite. Advantageously, this may be used to match the thermal expansion coefficients of different materials in a product in order to obtain desired acoustic properties for the product.

Figure 2A:
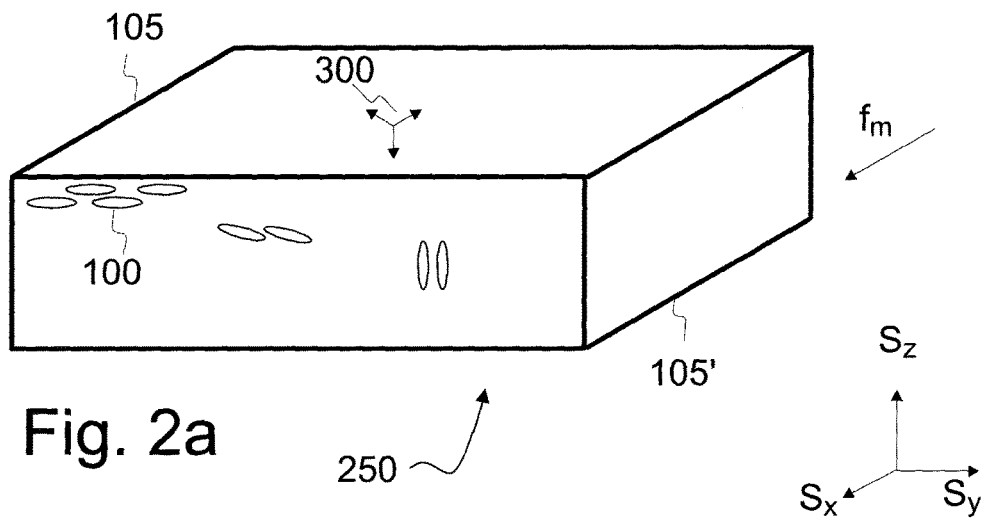
FIGS. 2a and 2b illustrate a composite structure comprising organic natural fiber material according to an example embodiment. The figure is not in any particular scale, and is meant to be an illustrative representation.
Figure 2B:
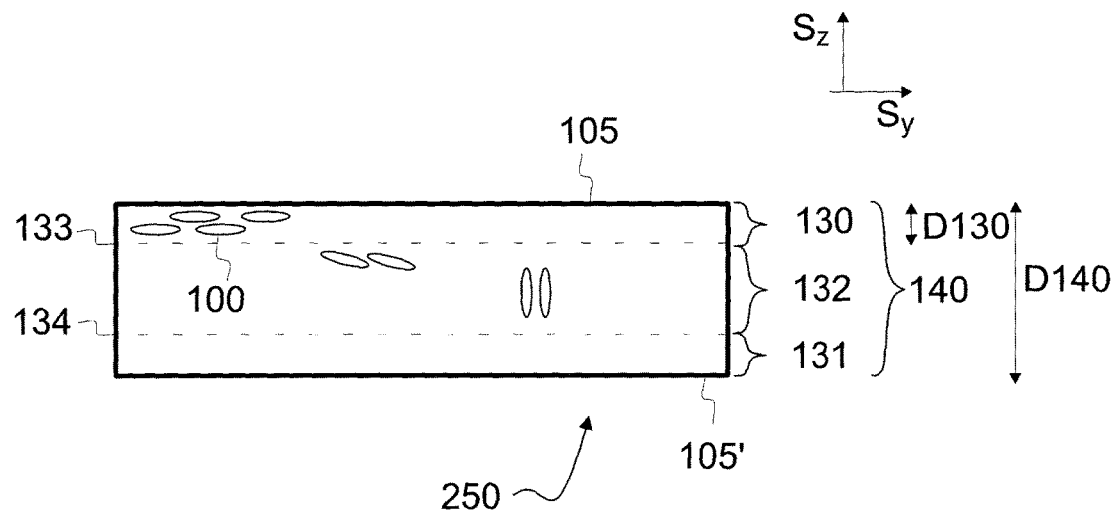

FIG. 1a, FIG. 2a, FIG. 2b and FIG. 4 illustrate an example of a composite structure 250 comprising fiber components 100 of organic natural fiber material. As described in FIGS. 2a and 2b, the composite structure 250 may have physical dimensions in orthogonal directions $S_x$, $S_y$, $S_z$. The composite may have a melt flow $f_m$ direction, which may be parallel to the direction $S_x$. The cross-sectional illustration in FIG. 2b illustrates that the composite structure 250 may extend vertically between a first surface 105 and a second surface 105'. The thickness 140 in direction $S_z$ may comprise a first surface zone 130 separated from an interior zone 132 by an interface 133, and a second surface zone 131 separated from the interior zone 132 by a second interface 134. The fiber components 100 may have an orientation according to the melt flow $f_m$ direction. In particular the fiber components 100 may have an orientation in addition in at least one surface zone 130 according to the surfaces 105, 105'.

Figure 4:
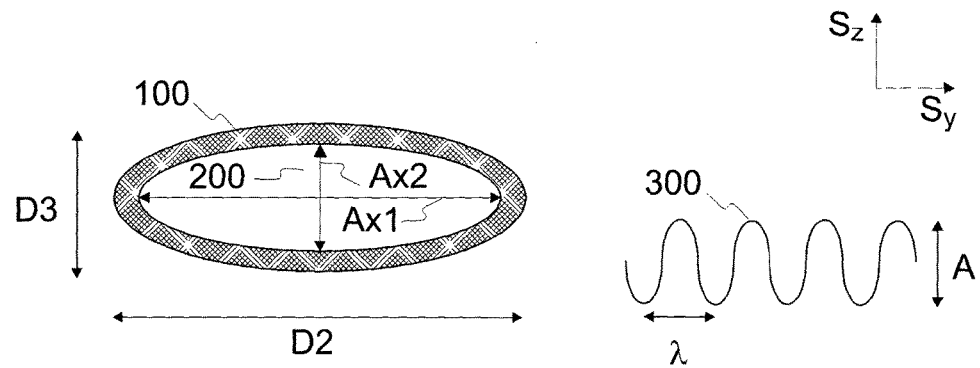
FIG. 4 illustrates an example embodiment of a sound wave and a fiber component of organic natural fiber material with an interior. The figure is not in any particular scale, and is meant to be an illustrative representation.

FIG. 1a and FIG. 4 illustrate the fiber component 100. The fiber component 100 may comprise a cavity or a hollow interior 200. The lumen may be surrounded by a shell layer 120 comprising cellulose molecules. Cellulose is a long-chain polymer of glucose molecules which has a degree of polymerization. Depending of the fiber component 100 length D1, the degree of polymerization may be as large as 10000, which means that a single cellulose polymer may comprise up to 10000 glucose molecules in a chemically stable formation. The polymer structures may extend in the shell layer 120. The fiber component 100 may therefore have a shape comprising a longitudinal dimension D1, where polymer structures of the cellulose material may extend in the principal direction $S_x$, which may be parallel to the length D1 of the component 100. The component 100 may have a flake form. A cross-section 110 of the fiber component 100 may have an flattened shape, with a major axis Ax1 and a minor axis Ax2 determining the horizontal dimension or width D2 and the vertical dimension or height D3 of the fiber component 100. The elliptic shape may vary along the longitudinal dimension D1 of the component. The dimensions D2 and D3 may vary along the longitudinal dimension D1 of the component.

The shape ratio D1/D2 may be determined to be the longitudinal dimension D1 divided by the horizontal dimension D2 of the fiber component 100. For example, a fiber component 100 with a longitudinal dimension D1 of 100 microns and a horizontal dimension D2 of 20 microns may have a shape ratio D1/D2 of 5 to 1.

The shape ratio D1/D3 may be determined to be the longitudinal dimension D1 divided by the vertical dimension D3 of the fiber component 100. For example, a fiber component 100 with a longitudinal dimension D1 of 50 microns and a vertical dimension D2 of 10 microns may have a shape ratio D1/D3 of 5 to 1.

In particular, the fiber component 100 may comprise chemically treated organic natural fiber material, such as organic natural fiber material from a Kraft process. The Kraft process reduces the lignin content of the organic natural material. Lignin may function as an adhesive material between the fiber components 100, but may at the same time isolate the fiber components 100 from the surroundings and hinder the settling of the fiber components 100 during composite manufacturing. Advantageously, the content of lignin in the fiber component 100 may be reduced by a chemical process to under 15 w-%, preferably under 5 w-%, more preferably under 1 w-% and most preferably under 0.5 w-%. The fiber components 100 may therefore have a low lignin content and be used to manufacture composite structure comprising flattened and oriented fiber components 100.

FIG. 4 further presents a sound wave 300. Usually sound refers to a mechanical wave. In this example, a sinusoidal plane wave 300 is used to describe the sound wave. The sound waves have certain frequency expressed in oscillations per second (called hertz). Wavelength A describes the distance between the adjacent points at the same phase. Amplitude A is comparable to the distance between the extreme points of the wave. An increase in amplitude is realized as an increase in loudness of the sound. Sound pressure is used to measure volume of sound. It refers to the sound wave induced temporary change in pressure compared to a static pressure. Generally most sounds comprise mixture of vibrations. A sound spectrum presents different frequencies present in a sound. The sound spectrum can be presented as a graph of either power of pressure as a function of frequency.

The sound wave 300 may propagate or be transmitted through a compressible solid, liquid or a gaseous media or plasma. The sound wave 300 propagates on a media, which is able to maintain the sound wave 300. Particles of the media vibrate around a static point in response to a propagating sound wave, while still maintaining their permanent original positions.

A sound wave 300 comprising a mechanical vibration may contact the surface 105 of the composite structure 250 as shown in FIG. 2a. Depending of the composition composite structure 250, the sound wave may be at least partially absorbed and/or transmitted to the composite structure 250. In a composite structure 250 comprising organic natural fiber material the speed of sound may be anisotropic and directionally dependent.

The speed of sound in one direction may be larger than the speed of sound in a direction perpendicular to it. The speed of sound in the melt flow $f_m$ direction $S_x$ may be denoted as $v_x$.

The speed of sound perpendicular to the melt flow $f_m$ direction $S_x$ may be denoted as $v_T$.

According to an embodiment $v_T$ may be perpendicular to the nearest surface 105 of the manufactured element 1200 comprising organic natural material.

According to an embodiment $v_T$ may be 10% smaller than $v_x$ or 20% smaller than $v_x$ or 30% smaller than $v_x$, advantageously 35% smaller than $v_x$ or 40% smaller than $v_x$ or 50% smaller than $v_x$, preferably 60% smaller than $v_x$ or 70% smaller than $v_x$ or 80% smaller than $v_x$.

The ratio $v_T/v_x$ may be in the range of 0.15 to 0.9, e.g. in the range of 0.2 to 0.8 or in the range of 0.15 to 0.85, for example between 0.3 and 0.9 or 0.2 and 0.8.

The matrix material may have an isotropic speed of sound $v_{bind}$.

The ratio $v_x/v_{bind}$ may be between 0.7 and 2.0.

The ratio $v_x/v_T$ may be more than 1:1. For example, the ratio $v_x/v_T$ may be in the range of 1.1:1 to 9:1, such as between 1.1:1 and 7:1, or between 2:1 and 8:1, for example between 3:1 and 9:1.

The $v_x$ may be up to or above 2000 m/s. By selecting the composition of the composite comprising organic natural fiber material the $v_x$ may be controlled. $v_x$ may be selected to be equal to or less than 2000 m/s, for example between 2000 m/s and 800 m/s, such as 1800 m/s and 1000 m/s. $v_x$ may be selected to be equal to or more than 2000 m/s, for example between 2000 m/s and 3800 m/s, such as 2000 m/s and 3000 m/s.

The $v_T$ may be selected to be equal to or less than 2000 m/s, for example between 2000 m/s and 800 m/s, such as 1800 m/s and 1000 m/s.

Table 2 presents speed of sound in some composite materials comprising organic natural fiber material.

TABLE 2

Speed of sound in some composite materials (1, 2, 3 and 4) comprising organic natural fiber material (between 30 and 50 w-%).

| Material | Speed of sound, m/s | Direction |
| --- | --- | --- |
| 1: 40 w-% fiber | 2600 | melt flow $f_m$ direction |
| 1: 40 w-% fiber | 850 | perpendicular to melt flow $f_m$ direction |
| 2: 40 w-% fiber | 2400 | melt flow $f_m$ direction |
| 2: 40 w-% fiber | 770 | perpendicular to melt flow $f_m$ direction |
| 3: 50 w-% fiber | 2500 | melt flow $f_m$ direction |
| 4: 30 w-% fiber | 2300 | melt flow $f_m$ direction |
| 4: 40 w-% fiber | 2400 | melt flow $f_m$ direction |
| 4: 50 w-% fiber | 2500 | melt flow $f_m$ direction |

As can be seen from samples 1 and 2 in Table 1, $v_x$ may be over three times larger than $V_T$. For example, the $v_T$ may be between 800 and 1000 m/s.

In the composite structure 250 the speed of sound may be highest in the direction of the melt flow $f_m$. This may be due to the orientation of the fiber components 100 in the composite structure 250. The fiber components 100 in composite structures 250 may have orientation in more than one direction, as illustrated in FIGS. 1b, 1c, 1d, 2a, 2b, 3a, 3b and 4.

Figure 1B:
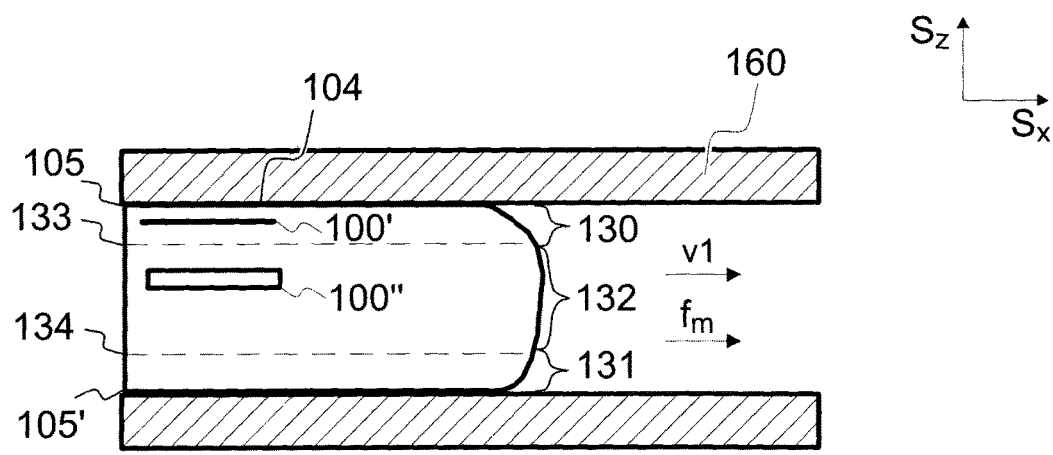
FIG. 1b illustrates the forming of a composite structure comprising organic natural fiber material. The figure is not in any particular scale, and is meant to be an illustrative representation.
Figure 1C:
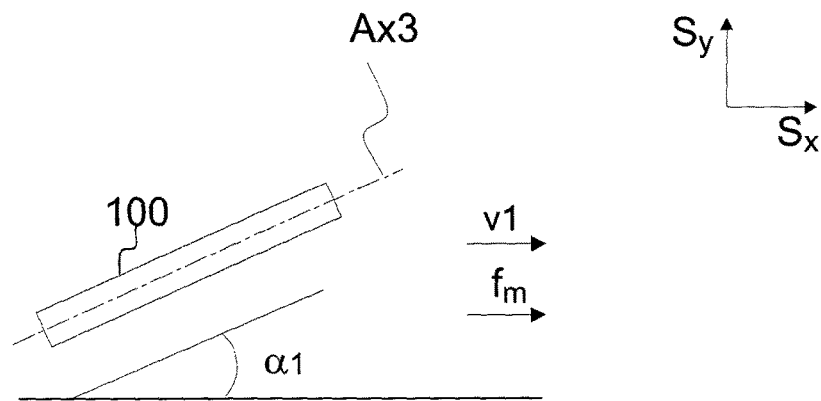
FIG. 1c illustrates the longitudinal orientation of a fiber component of organic natural fiber material in a melt flow. The figure is not in any particular scale, and is meant to be an illustrative representation.

FIG. 1b illustrates the forming of a composite structure 250. During the manufacturing of a composite structure 250 a mixture comprising the matrix material and the organic natural fiber material, denoted as melt, may be introduced at a velocity v1. The material may flow in a principal direction $f_m$. The direction of the flow may be controlled by a mould 160. The material may have a temperature tp1, and the mould may have a temperature tp2. The temperature tp2 may be lower than the temperature tp1. Therefore, a temperature difference Δtp, which is the difference between temperatures tp2 and tp1, respectively, may be selected. When the mixture contacts the surface 104 of the mould, the temperature tp1 of the mixture decreases and the material starts to cool down. Cooling of the material forms the first surface 105, the second surface 105', the first surface zone 130, the second surface zone 131 and the interior zone 132. By selecting the velocity v1 and the temperatures tp1 and tp2, the thickness of the surface zones 130, 131 and the interior zone may be adjusted. The fiber component 100 may flow with the melt and may be oriented such that the longitudinal dimension D1 of the fiber component 100 is substantially oriented along the direction of the melt flow $f_m$. By 'substantially oriented' it is meant that the fiber components prefer to orientate along the direction of the mass flow $f_m$. For example, at least 60%, advantageously at least 70%, preferably at least 80% of the fiber components 100 may have a deviation angle α1, which is smaller than or equal to 45 degrees. A fiber component 100 may refer to a fiber comprising a longitudinal dimension D1 of at least 100 microns and an aspect ratio D1/D2 of at least 5 to 1. Deviation angle α1 refers to the angle between the longitudinal axis Ax3 and the direction $S_x$ of the melt flow $f_m$, as illustrated in FIG. 1c. For example, the deviation angle α1 may be less than 40 degrees, advantageously less than 35 degrees, more advantageously less than 30 degrees, most advantageously less than 20 degrees. The orientation may be measured for example from an electron microscopy image or by x-ray tomographic imaging.

At least 60%, advantageously at least 70%, preferably at least 80% of the fiber components 100 may have a deviation angle α1, which is smaller than or equal to 30 degrees.

The orientation of the fiber components 100 in the direction of the melt flow $f_m$ may occur through the composite structure in both the surface layers and the interior layer. The direction $S_x$ of the melt flow $f_m$ is parallel to the direction— $S_x$ opposite melt flow $f_m$. This substantially parallel orientation of the longitudinal longitudinal dimensions D1 of the fiber components 100 may have an effect on the acoustic properties of the composite structure. The In other words, the organic natural fiber material may comprise fiber components 100, and the composite structure 250 may comprise a longitudinal dimension and transverse dimension which are perpendicular to each other and parallel to the composite surface 105, and wherein at least part of longitudinal dimensions of the fiber components 100 of the organic natural fiber material are orientable substantially parallel with the longitudinal dimension of the composite.

By selecting
- the composition of the mixture comprising the matrix material and the organic natural fiber material and/or
- the shape ratio of the organic natural fiber material and/or
- the ratio of the matrix material and the organic natural fiber material and/or
- the velocity v1 of the introduction of the mixture comprising the matrix material and the organic natural fiber material
- the temperature difference Δtp between the temperatures tp2 and tp1, the acoustic properties of the composite structure may be controlled.

Therefore, a method for providing a composite may comprise
- providing a polymer matrix;
- providing organic natural fiber material, which is orientable such that propagation of sound in the composite is anisotropic.

Such a method may provide a composition comprising
- organic natural fiber material and
- a polymer matrix,
- the organic natural fiber material being oriented such that propagation of sound in the composite is anisotropic.

Further, a method for producing a composite may comprise:
- selecting a shape ratio for a fiber component (100) of organic natural fiber material
- selecting a weight ratio for a mixture comprising fiber components (100) of organic natural fiber material and polymer matrix
- introducing the mixture at a velocity v1; and
- orienting the fiber components (100)

wherein
- the fiber component (100) comprises a longitudinal dimension, a horizontal and a vertical dimension, and wherein at least 60% of the fiber components (100) have a shape ratio of the longitudinal dimension (D1) to a vertical (D3) dimension of at least 5 to 1.

The components for the composition of the mixture comprising the matrix material and the organic natural fiber material may be selected to obtain a desired density and heat expansion for the composite material. Heat expansion may depend of the direction in the composite structure 250. In addition, the composition composite structure 250 may have an effect on the heat expansion. For example, heat expansion in a composite structure 250 comprising 40 w-% of organic natural fiber material may have a larger heat expansion than a composite structure 250 comprising 50 w-% of organic natural fiber material. Therefore, the dimensional stability of a composite structure 250 comprising 50 w-% of organic natural fiber material may be improved compared to a composite structure 250 comprising less organic natural fiber material. The selection of the composition may therefore be used to control the speed of sound in the material.

The aspect ratio of the organic natural fiber material may be selected to have an effect to the speed of sound in the composite structure. The sound wave 300 may be advantageously transmitted at a first speed $v_x$ in the longitudinal dimension D1 of the fiber, which may be substantially parallel to the direction $S_x$ of the melt flow $f_m$. The sound wave 300 may be advantageously transmitted at a second speed $v_T$ in a direction perpendicular to the direction $S_x$ of the melt flow $f_m$. The speed $v_T$ may be different in directions $S_y$ and $S_z$ In particular, the speed of sound may vary at these two perpendicular directions, as described in Table 2. In an advantageous example, the speed of sound may vary at least 10% at two perpendicular directions, of which one is the direction $S_x$ of the melt flow $f_m$. The ratio of the matrix material and the organic natural fiber material may be used to affect the density of the polymer structure and the modulus of elasticity.

Figure 9:
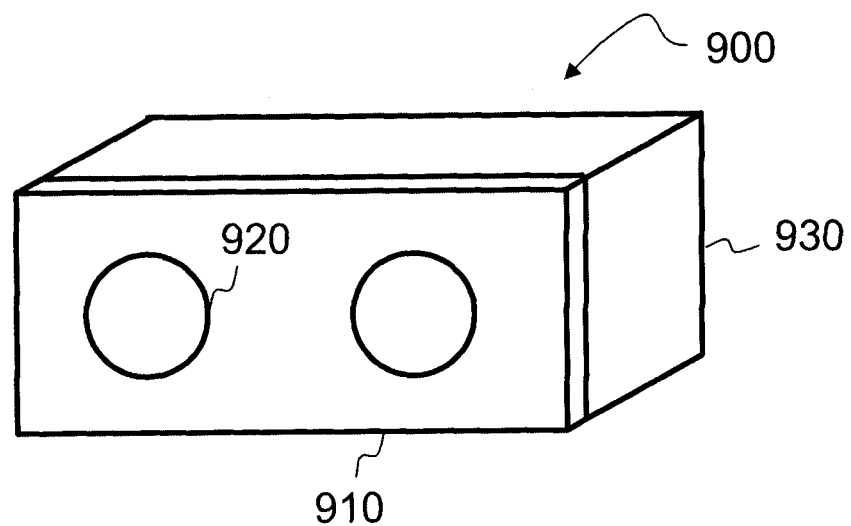
FIGS. 9 and 10 present use of a composite comprising organic natural fiber material in a system where data in digital or electrical form may be converted into an acoustic sound wave according to at least some embodiments of the invention. The figures are not in any particular scale, and are meant to be illustrative representations.
Figure 10:
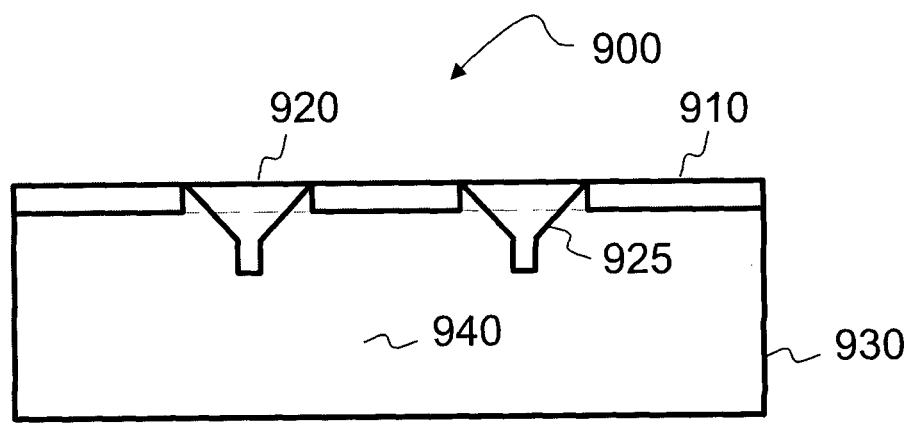

The high specific modulus (ratio between the tensile modulus and the density) may in some applications be highly advantageous. FIGS. 9 and 10 illustrate the use of a composite comprising organic natural fiber material in a system where data in digital or electrical form may be converted into an acoustic sound wave. The audio system 900 may comprise an enclosure 930 comprising an interior 940 for mounting a driver 920. The enclosure may also be used to prevent sound waves 300 emanating from the back of a driver 920 from interfering destructively with those from the front. The enclosure 930 material should not vibrate or comply due to the sound energy from the cone or the diaphragm of the speaker. The driver 920 may be attached to a flat panel 910, also denoted as a 'baffle'. The panel 910 may comprise an opening for the mounting of the driver 920. The driver may comprise a cone 925, which ideally may be rigid, light and able to reduce vibrations. Acoustic properties play a key role in the loudspeaker system, and use of a composite structure 250 comprising desired acoustic properties, for example in the cone 925, enclosure 930 or the panel 910, may improve the acoustic behavior of the system. Composite structures 250 may be specifically designed for loud speaker components.

Figure 3A:
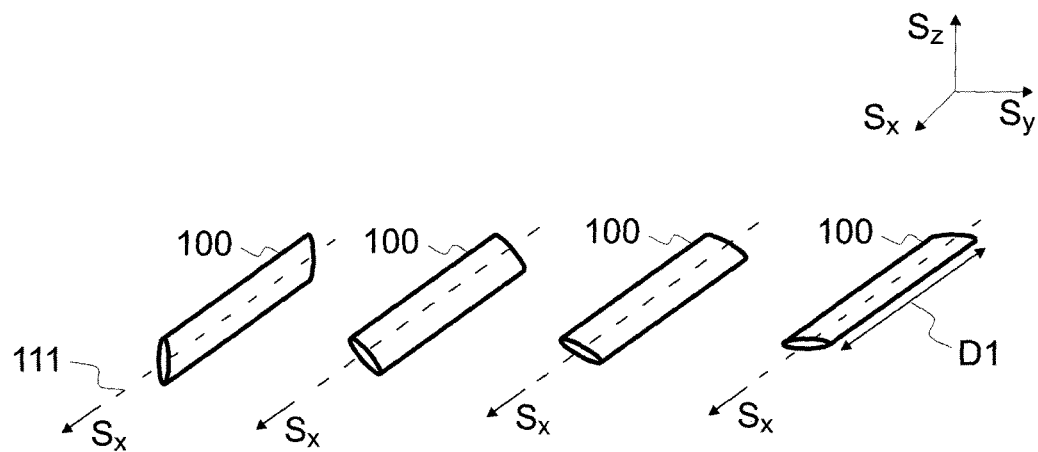
FIGS. 3a and 3b illustrate the orientation of a fiber component of organic natural fiber material around the longitudinal axis in a surface zone during composite formation according to an example embodiment. The figure is not in any particular scale, and is meant to be an illustrative representation.
Figure 3B:
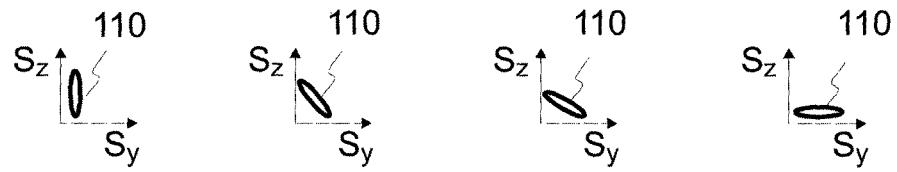

Advantageously, the modulus of elasticity of the component may be selected by orientation of the fiber components in at least one surface zone 130, 131. The longitudinal dimension D1 of the fiber component 100 may be oriented parallel to the direction of the melt flow $f_m$, as illustrated in FIG. 1b. The width parallel to the major axis Ax1 of the fiber component 100 may in addition be oriented parallel to the direction $S_z$ (vertically) as shown for fiber component 100" or parallel to the direction $S_y$ (horizontally) as shown for fiber component 100'. The fiber component 100 may be oriented in a surface zone, as illustrated in FIGS. 1d, 2a, 2b, 3a and 3b. FIGS. 3a and 3b illustrate how the fiber component 100 may rotate around the longitudinal axis Ax3 of the fiber component 100.

In FIG. 2b,

The ratio D130/D140 may be e.g. greater than or equal to 10%.

The ratio D130/D140 may be e.g. greater than or equal to 10%, wherein the ratio may be smaller than or equal to 200 microns.

When D140 is greater than or equal to 500 microns, D130 may be smaller than or equal to 200 microns.

Figure 1D:
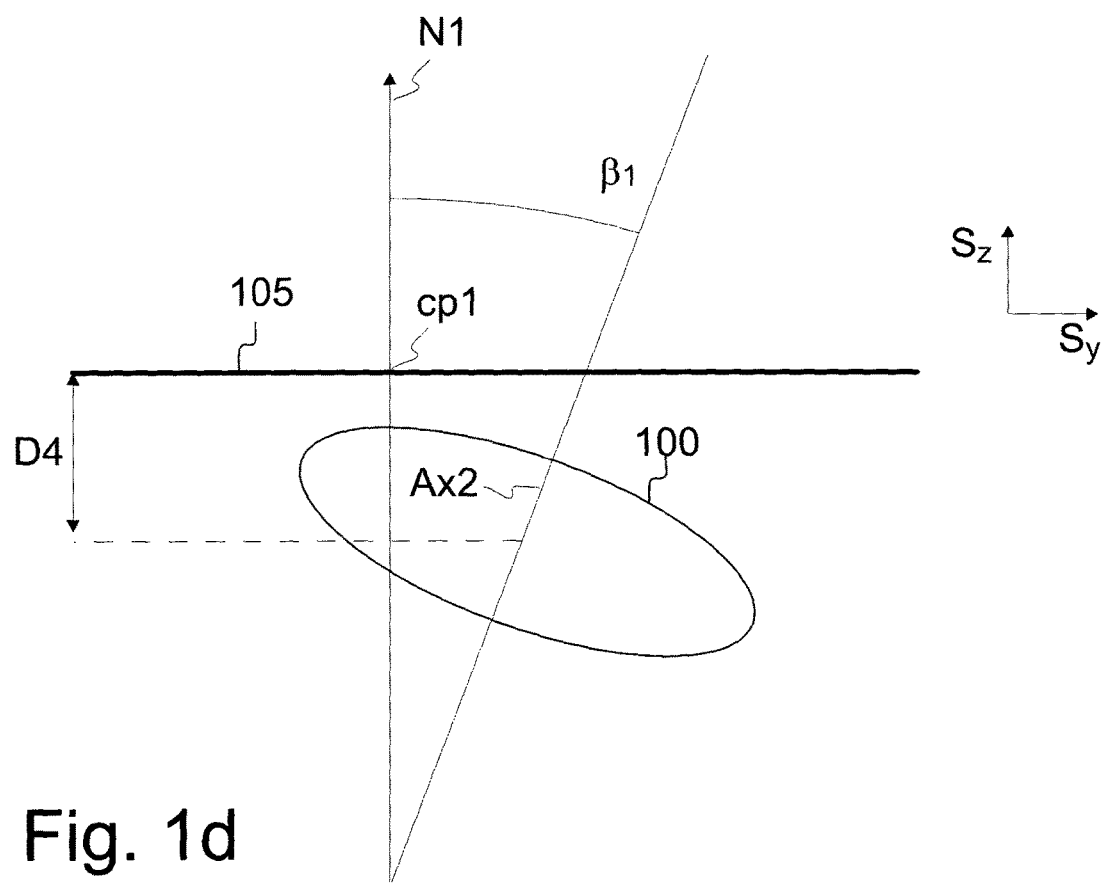
FIG. 1d illustrates the orientation of a fiber component of organic natural fiber material around the longitudinal axis in a surface zone. The figure is not in any particular scale, and is meant to be an illustrative representation.

The minor axis Ax2 of fiber components 100 which are in the vicinity of the surface 105, 105' may be aligned substantially along a surface normal N1. For fiber components where D4 is equal to or smaller than D130, the following criteria for a rotation angle β1 may be fulfilled. For example, at least 60%, advantageously at least 70%, preferably at least 80% of the fiber components 100 may have a rotation angle β1, which is smaller than or equal to 45 degrees. A fiber component 100 may refer to a fiber comprising a longitudinal dimension D1 of at least 100 microns and an aspect ratio D1/D2 of at least 5 to 1. Rotation angle β1, refers to the angle between the minor axis Ax2 of a fiber component 100 and the normal N1, as illustrated in FIG. 1d. The normal N1 means the normal of the surface 105 at a point cp1 which is closest to said fiber component 100. The depth D4 may be defined as a distance perpendicular from the surface 105 to the center of the fiber component 100 at the minor axis Ax3.

For example, the rotation angle β1 may be less than 40 degrees, advantageously less than 35 degrees, more advantageously less than 30 degrees, most advantageously less than 20 degrees. The orientation may be measured for example from an electron microscopy image or from an topographical x-ray image.

For example, the rotation angle β1 may be less than 60 degrees, advantageously less than 40 degrees, more advantageously less than 30 degrees, most advantageously less than 20 degrees. The orientation may be measured for example from an electron microscopy image or by x-ray tomographic imaging.

At least 60%, advantageously at least 70%, preferably at least 80% of the fiber components 100 may have a rotation angle β1, which is smaller than or equal to 30 degrees.

Advantageously, the specific modulus of the composite structure 250 may be improved by orienting the fiber components 100 in at least one surface zone. In addition to the anisotropic speed of sound, the ratio of tensile modulus to the density of the composite structure 250 may be selected according to the application. For example, a lower specific modulus may be useful in musical instruments or loudspeaker systems. In musical instruments a composite comprising high stiffness combined with low loss coefficient may be preferred. However, in other applications, such as in isolating panels for car doors or interior walls, more stiffness with increased dampening (by increased loss coefficient) may be required from the composite.

The properties of a composite may be influenced by the properties of the individual components in the composite, the geometry and orientation of the organic natural fiber material in the composite, and the surface interaction of the organic natural fiber material and the polymer matrix. Advantageously the materials used in the composite product may be selected such that the formed composite will obtain the desired properties. For example, the organic natural fiber material may comprise cellulose regions which are interconnected via lignin and hemicellulose fragments. When selecting the organic natural fiber material and polymer matrix which may be used for the manufacturing of the composite, it may be advisable to select the materials such that the used polymer matrix has a melting point (temperature) below the temperature where the used organic natural fiber material may start to decompose (burn). If the process temperature is increased further, the organic natural fiber material may begin to lose its structure and decompose; therefore material temperatures less than 230° C. in the process are preferred. The temperature where organic natural fiber material starts to decompose may be related to the amount of lignin present in the material, as higher lignin content may start to decompose more easily in high temperatures than fiber material free of lignin.

The production of a composite comprising organic natural fiber material can be done by a number of methods, extrusion, injection molding, compression molding, foaming or the like being example techniques. Composite comprising organic natural fiber material can be further shaped by thermoforming, sawing, drilling, grinding or other methods used for forming a shaped article. The above listed methods illustrate non-limiting example techniques which may be combined.

Figure 5:
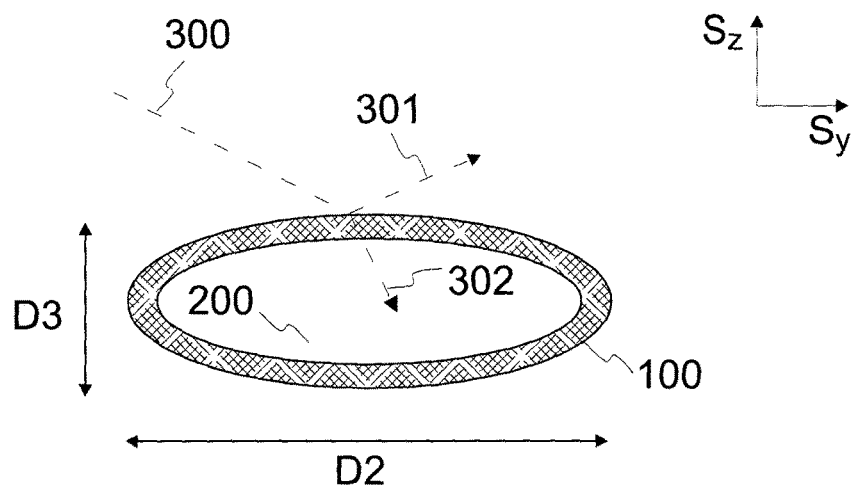
FIG. 5 illustrates an example embodiment of a sound wave contacting a fiber component of organic natural fiber material. The figure is not in any particular scale, and is meant to be an illustrative representation.

FIG. 5 illustrates a sound wave 300 facing an organic natural fiber material 100. As shown in FIG. 5, a sound wave 300 may reflect 301 away at the surface of the organic natural fiber material. Alternatively a sound wave 300 may refract 302 at the surface of the organic natural fiber material, and propagate through the organic natural fiber material. By increasing the proportion of the organic natural fiber material in the composite structure 250 the anisotropic nature of the composite may be modulated. For example, some components of sound wave may be reflected, while some components may be refracted. Further it is possible that two or more sound waves interfere and have multiplying effect to each other. Sound waves in an opposite phase may attenuate each other. The shell layer 120 of the fiber component 100 may improve the transmittance of a sound wave 300.

Figure 6:
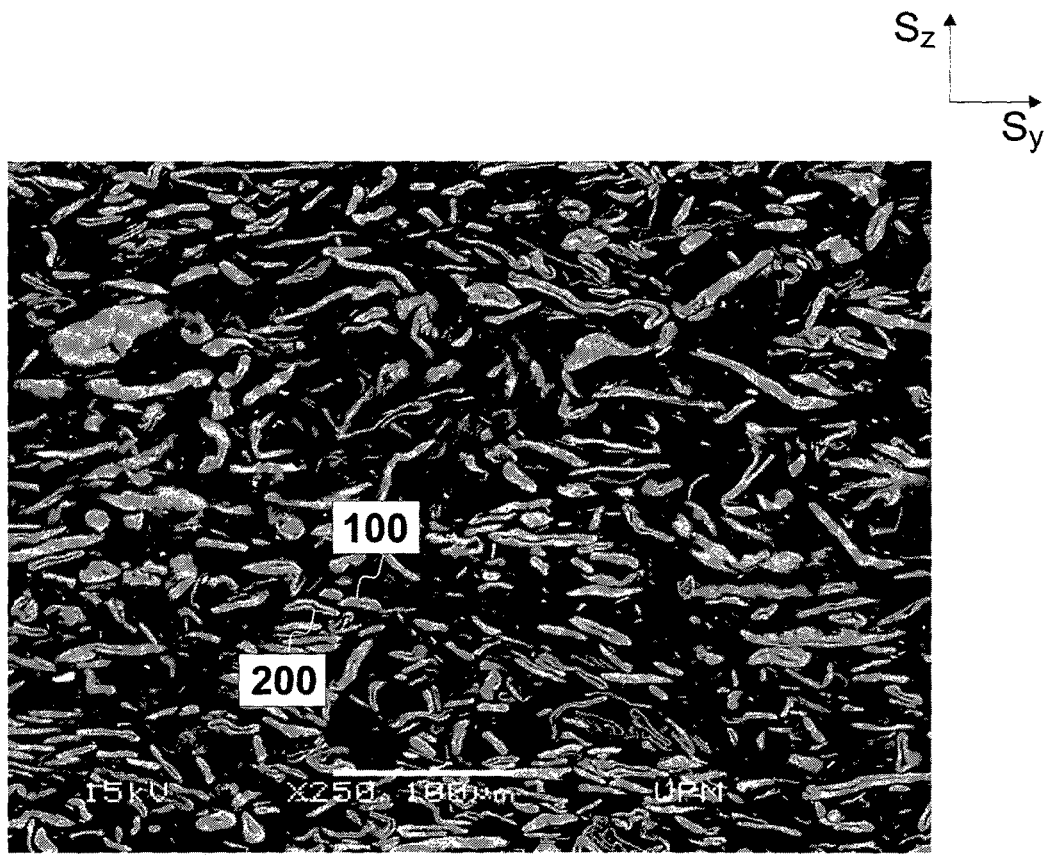
FIG. 6 is a 250 times magnified cross-sectional image with a scale bar of a composite product comprising organic natural fiber material according to an embodiment of the invention.

FIG. 6 is a 250 times magnified cross-sectional image with a scale bar of a portion of a composite product comprising organic natural fiber material according to an embodiment of the invention. The cross-sections of fiber components 100 may be seen in light gray colour with the hollow interior 200 darker in the center. The dark background between the fibers is matrix material.

Figure 7:
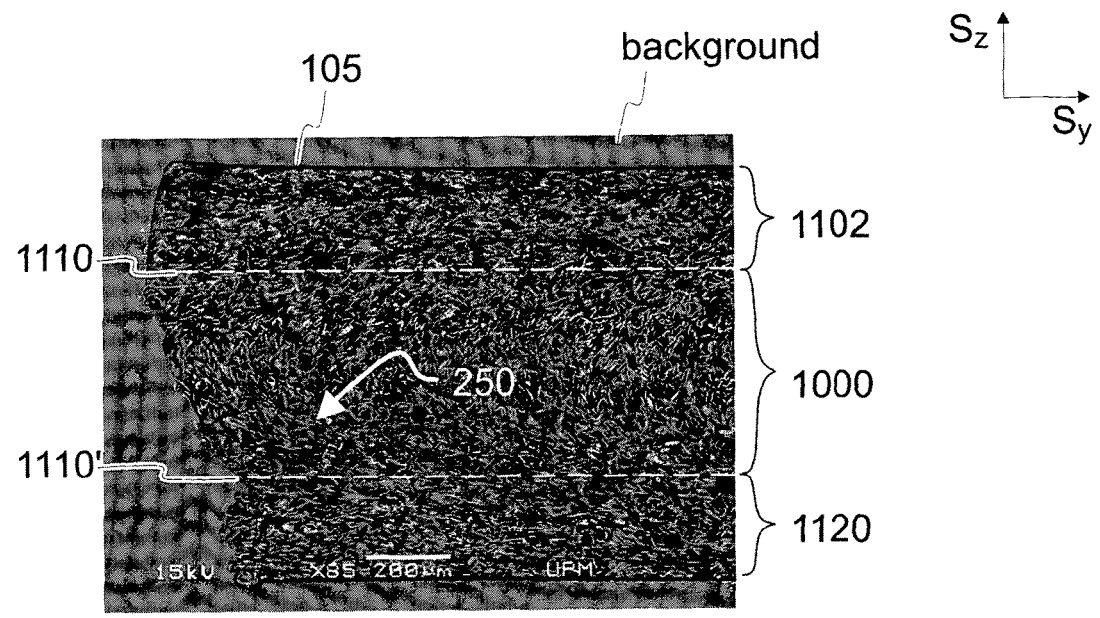
FIGS. 7 and 8 are 85 times magnified cross-sectional images with scale bars of composite products showing the structure of the composites according to an example embodiment extending from the surfaces towards the interior of the products with layer interfaces depicted by dashed lines in white.
Figure 8:
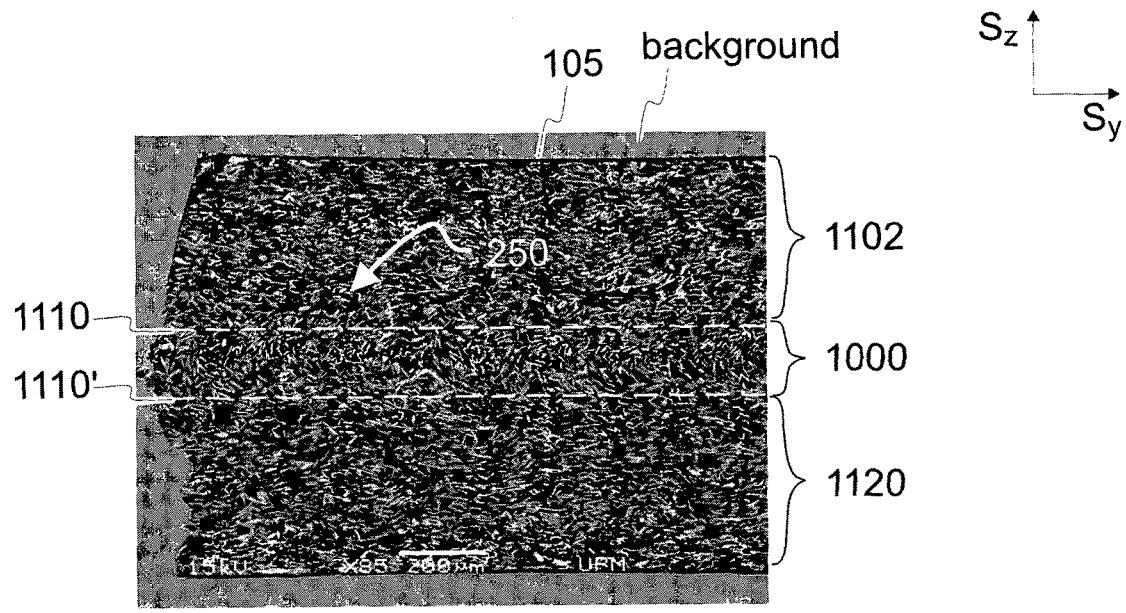

FIGS. 7 and 8 are 85 times magnified cross-sectional images with scale bars of portions of composite products showing the structure of the composites according to an example embodiment. The composite structure 250 is presented against a background in matt gray colour. Interfaces 1110 and 1110' between the interior zone 1000 and the surface zones 1102 and 1120 are depicted by dashed lines in white. FIGS. 7 and 8 have been taken with a scanning electron microscope and present composite structures manufactured at different velocity v1. In FIG. 7 a higher velocity has been used, which has lead to a surface zone 1102 with diminished thickness. In FIG. 8 a slower velocity v1 has been used, which has increased the thickness of the surface zone 1102. In both FIGS. 7 and 8, the orientation of the fiber components 100 at the surface zone in comparison to the interior may be seen. The orientation of the fiber components 100 in the direction $S_x$ of the melt flow occur through the composite structure in both the surface layers 1102,1120 and the interior layer 1000. In addition, the orientation of the fiber components 100 in the surface zones 1102,1120 is substantially parallel to the direction $S_y$ perpendicular to the direction $S_x$ of the melt flow $f_m$.

Figure 11:
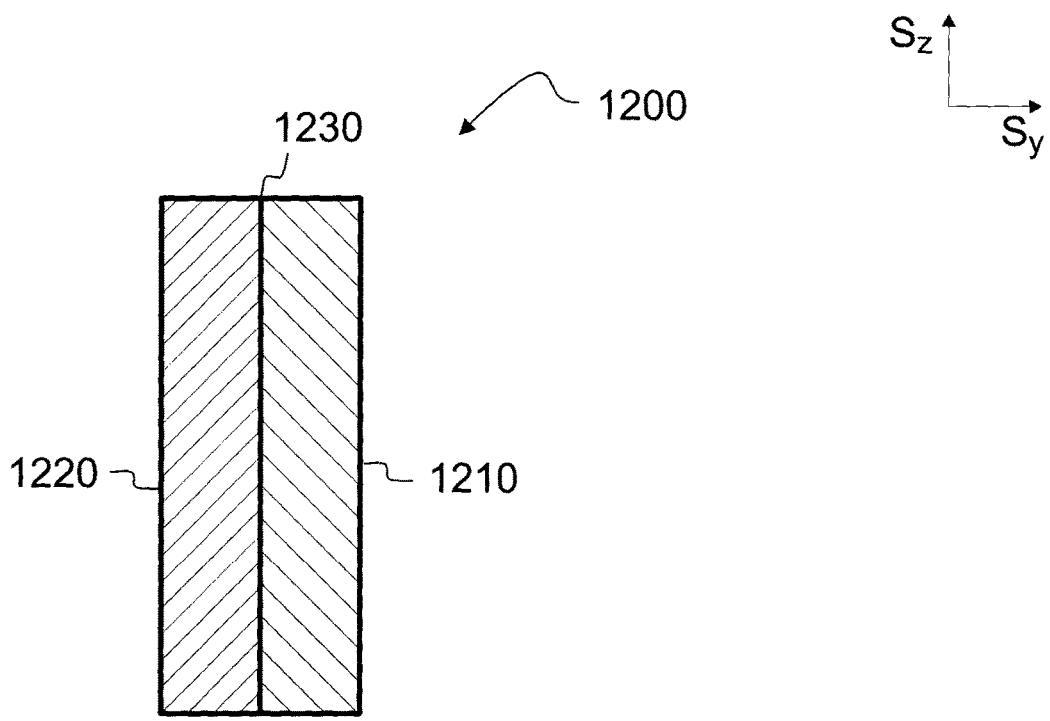
FIG. 11 presents use of a composite comprising organic natural fiber material to dampen acoustic sound waves according to at least some embodiments of the invention. The figure is not in any particular scale, and is meant to be an illustrative representation.

FIG. 11 illustrates an element 1200 comprising organic natural fiber material. The element 1200 may comprise a first panel 1210 and a second panel 1220 joined by an interface 1230. The of the first panel and the second panel may differ. These types of composite structures may be used for example to improve the acoustic behaviour of larger interior spaces. Examples of such applications could be concert halls, meeting rooms, exhibition areas, cabins, recording studios or other similar premises. The panels may e.g. have sound reflective or re-directing properties.

The acoustic properties of an element 1200 may be optimized to a frequency range. The frequency range may begin at a frequency below 1000 Hz. For example, the frequency range may be between 100 Hz and 3150 Hz, such as typically used for panels used in facades. For other applications the frequency may be at least 500 Hz. Vehicle noise may typically be on a range between 500 Hz and 1500 Hz. Frequency ranges may be, for example below 2000 Hz or below 5000 Hz. Alternatively, frequency ranges above 2000 Hz may be used.

For example, the element 1200 may be used as a component in a portable device, where the element 1200 may function as an reinforcing element or a component for the device. In addition, the element 1200 may be integrated to the product and function as an enclosure with desired acoustic behaviour.

The element may, for example, dampen or transmit sound or vibrational waves directionally.

Figure 12:
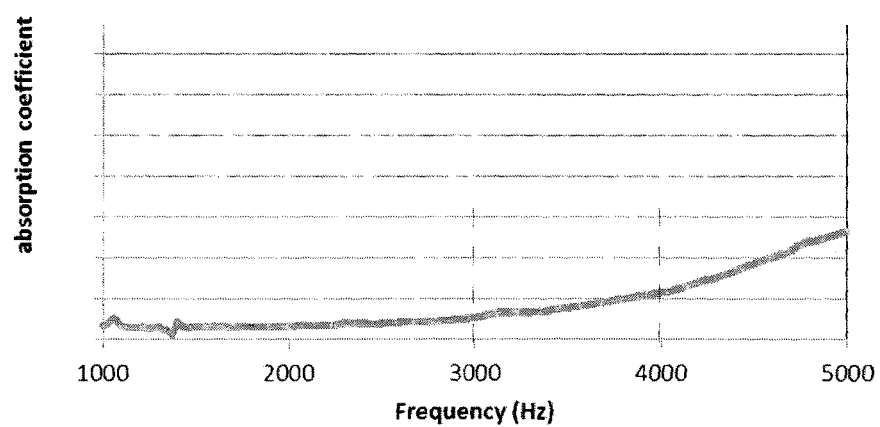
FIG. 12 shows results of an experiment performed to characterize the acoustic properties of a composite comprising organic natural fiber material.

FIG. 12 shows an example where the acoustic properties, such as sound absorption, acoustic impedance and damping properties, of a composite structure 250 comprising 30 w-% of organic natural fiber material was characterized. The results were gathered as a spectrum of frequencies starting from 1000 Hz. The absorption coefficient increased towards higher frequencies. At and above 3000 Hz the absorbing properties of the composite structure 250 had clearly improved. At and above 4000 Hz the absorbing properties of the composite structure 250 had clearly improved. At and above 5000 Hz the absorption coefficient had clearly increased. The test was performed according to ISO 10534-2 (2012) standard.

The following standards may be used to measure acoustic properties of composite structure 250 comprising organic natural fiber material:

ISO 354 Sound absorption, testing room
ISO 6721-3 Vibration damping
ISO 10534-1 Sound absorption coefficient, Standing wave method
ISO 10534-2 Sound absorption coefficient, Impedance tube method
ISO 140 Measurement of sound insulation
ASTM E90-09 Standard Test Method for Laboratory Measurement of Airborne Sound Transmission Loss of Building Partitions and Elements ISO 3382 Measurement of room acoustic parameters Orientation of the organic natural fiber material component in a composite can be predicted and/or planned using a simulation software for a mould. Certain pre-determined amount of the natural fiber based component may typically be needed for a composite in order to achieve certain properties of the composite. Desired acoustic properties may be achieved by fiber orientation.

According to an embodiment, a composite material comprising organic natural fiber material, may be used for making a musical instrument. Musical instruments are often made of wood. Despite good and desired audio properties, wood often reacts and adapts to environmental changes. For example moisture content of the air has effect on wood, and needs to be taken into account when designing and manufacturing an instrument of wood. Also unwanted thermal expansion or contraction may occur. According to an embodiment, a desired coefficient of thermal expansion may be achieved for a composite material by choosing the plastic component and the amount of organic natural fiber material. The inherent properties of the plastic component and the amount of organic natural fiber material may be used to optimally for the selected application. The properties and amounts may depend on the application and desired properties of the composite material. For example, it may be desirable to achieve the same kind of behavior for adjacent or neighboring parts or components of an instrument. In violin it may be desired that the properties of the violin correspond with the properties of the spring. The same may apply to instruments, where component parts of different material are used for playing; or combined next to each other at the instrument frame. Typically wood may have a smaller coefficient of thermal expansion than a metal and a metal may have a smaller coefficient of thermal expansion than a plastic.

According to an embodiment a composite material comprising natural fiber based material may be used to replace different kind of original parts. For example in musical instruments, composite material according to embodiments may replace some wood parts and some metallic parts. In one embodiment, this is enabled by stability of the composite material. Desired properties may be achieved by composite material, thus there may be no need to use separate materials and/or parts.

Numbered Items:

1. A composition comprising
    a matrix material and
    organic natural fiber material,
    wherein speed of sound is arranged to be different in different directions in the composition.
2. A composite according to numbered item 1, wherein speed of sound in different directions varies so that difference is at least 10%.
3. A composite according to any of preceding numbered items, wherein speed of sound is different in a direction of organic natural fiber material and perpendicular to said direction.
4. A composite according of any of preceding numbered items, wherein speed of sound is below 1800 m/s in at least one direction in the composition.
5. A composite according to any of preceding numbered items, wherein speed of sound is different in a longitudinal direction of the composition and in a direction perpendicular to said direction.
6. A composite according to preceding numbered item 5, wherein the longitudinal direction of the composition corresponds to a direction of a melt flow of the composite.
7. A composite according to any of preceding numbered items, wherein ratio of the speed of sound being at least or below 3:1 in different directions.
8. A composite according to any of preceding numbered items, wherein speed of sound in a direction of a melt flow and in a direction perpendicular to the melt flow are different.
9. A composite according to any of preceding numbered items, wherein at least 60% of the natural fiber material being longitudinally oriented parallel with the longitudinal direction of the composite.
10. A composite according to any of preceding numbered items, wherein at least 80% of the natural fiber material comprises an averaged deviation angle ($\alpha 1$) less than 40 degrees at a direction of a melt flow ($f_m$) of the composite.
11. A composite according to any of preceding numbered items, wherein the organic natural fiber material comprises fiber components, and wherein at least part of longitudinal dimensions of fiber components of the organic natural fiber material are parallel with a melt flow direction of the composite.
12. A composite according to any of preceding numbered items, wherein the organic natural fiber material comprises fiber components, where longitudinal dimension of the fiber components are oriented along a melt flow direction of the composite such that at least 80% of the fiber components being oriented along a melt flow direction of the composite.
13. A composite according to any of preceding numbered items, wherein the organic natural fiber material comprises fiber components comprising a longitudinal dimension, a horizontal dimension and a vertical dimension, and wherein at least 60% of the fiber components (100) have a shape ratio of the longitudinal dimension (D1) to the vertical (D3) dimension of at least 4 to 1; or at least 10:1.
14. A composite according to any of preceding numbered items, wherein the organic natural fiber material comprises polymer structures of the cellulose material.
15. A composite according to any of preceding numbered items, wherein the organic natural fiber material is in the form of a flake.
16. A composite according to any of preceding numbered items, wherein the organic natural fiber material comprises flakes having width of at least two times larger than thickness.
17. A composite according to numbered items 15 or 16, wherein at least some of the flakes comprise a flattened interior.
18. A composite according to any of preceding numbered items, wherein a surface zone (130,131) of the composite extends from a longitudinal surface (105, 105') of the composite perpendicularly towards the interior (132) of the composite; and the surface zone comprises thickness of at least 10% of the thickness of the composite, when the thickness of the composite is less than 500 microns; or the surface zone comprises thickness of up to 200 microns.
19. A composite according to any of preceding numbered items, further comprising orienting fiber components (100) in at least one surface zone (130, 131).
20. A composite according to any of preceding numbered items, wherein the organic natural fiber material comprises fiber components; and wherein the composite comprises more oriented fiber components than fiber components substantially deviating from longitudinal orientation in at least one surface zone.
21. A composite according to any of preceding numbered items, wherein the organic natural fiber material comprises fiber components, and wherein at least 80% of the fiber components in the vicinity of a surface of the composite are aligned along normal of the surface, such that rotation angle ($\beta 1$) around longitudinal dimension of the fiber components is less than 40 degrees.
22. A composition according to any of preceding numbered items, wherein the matrix material comprises polymer matrix.
23. A composition according to any of preceding numbered items, wherein the matrix material comprises plastic or thermoplastic.
24. A composite according to any of preceding numbered items, wherein the composition comprises a specific modulus (tensile modulus divided by density) of at least 1900 MPa/g/cm$^3$.
25. A composite according to any of preceding numbered items, wherein the organic natural fiber material comprises lignin under 15 percentage by weight; or under 5 percentage by weight; or under 1 percentage by weight; or under 0.5 percentage by weight.
26. A composite according to any of preceding numbered items, wherein the composite (250) comprises absorbing properties at frequencies above 500 Hz, or at frequencies above 1000 Hz, at frequencies above 2000 Hz, or at frequencies above 3000 Hz, or at frequencies above 4000 Hz.

27. A composite according to any of preceding numbered items, wherein modulus of elasticity of the component is selected by orientation of the fiber components in at least one surface zone.

28. A composite according to any of preceding numbered items, wherein the matrix material is selected according to desired acoustic properties of the composite 29. A composite according to any of preceding numbered items, wherein amount of fiber comprised in the organic natural fiber material is selected according to desired acoustic properties of the composite.

30. A composite according to any of preceding numbered items, wherein average length of original natural fiber material is selected according to desired acoustic properties of the composite.

31. A composite according to any of preceding numbered items, wherein elastic modulus and/or loss coefficient of the composite are selected according to desired acoustic properties of the composite.

32. A composite according to any of preceding numbered items, wherein thermal expansion coefficient of the composite is selected by chosen matrix material, amount of the fiber in the organic natural fiber material and orientation of the fiber.

33. A method for providing a composite comprising:
 providing a matrix material and
 providing organic natural fiber material,
  wherein speed of sound is different in different directions in the composition.

34. A method according to numbered item 33, wherein speed of sound in different directions varies so that difference is at least 10%.

35. A method according to any of preceding numbered items 33-34, wherein speed of sound is different in a direction of organic natural fiber material and perpendicular to said direction.

36. A method according of any of preceding numbered items 33-35, wherein speed of sound is below 1800 m/s in at least one direction in the composition.

37. A method according to any of preceding numbered items 33-36, wherein speed of sound is different in a longitudinal direction of the composition and in a direction perpendicular to said direction.

38. A method according to preceding numbered item 37, wherein the longitudinal direction of the composition corresponds to a direction of a melt flow of the composite.

39. A method according to any of preceding numbered items 33-38, wherein ratio of the speed of sound being at least or below 3:1 in different directions.

40. A method according to any of preceding numbered items 33-39, wherein speed of sound in a direction of a melt flow and in a direction perpendicular to the melt flow are different.

41. A method according to any of preceding numbered items 33-41, wherein at least 60% of the natural fiber material being longitudinally oriented parallel with the longitudinal direction of the composite.

42. A method according to any of preceding numbered items 33-41, wherein at least 80% of the natural fiber material comprises an averaged deviation angle ($\alpha 1$) less than 40 degrees at a direction of a melt flow ($f_m$) of the composite.

43. A method according to any of preceding numbered items 33-42, wherein the organic natural fiber material comprises fiber components, and wherein at least part of longitudinal dimensions of fiber components of the organic natural fiber material are parallel with a melt flow direction of the composite.

44. A method according to any of preceding numbered items 33-43, wherein the organic natural fiber material comprises fiber components, where longitudinal dimension of the fiber components are oriented along a melt flow direction of the composite such that at least 80% of the fiber components being oriented along a melt flow direction of the composite.

45. A method according to any of preceding numbered items 33-44, wherein the organic natural fiber material comprises fiber components comprising a longitudinal dimension, a horizontal dimension and a vertical dimension, and wherein at least 60% of the fiber components (100) have a shape ratio of the longitudinal dimension (D1) to the vertical (D3) dimension of at least 4 to 1; or at least 10:1.

46. A method according to any of preceding numbered items 33-45, wherein the organic natural fiber material comprises polymer structures of the cellulose material.

47. A method according to any of preceding numbered items 33-46, wherein the organic natural fiber material is in the form of a flake.

48. A method according to any of preceding numbered items 33-47, wherein the organic natural fiber material comprises flakes having width of at least two times larger than thickness.

49. A method according to numbered items 47 or 48, wherein at least some of the flakes comprise a flattened interior.

50. A method according to any of preceding numbered items 33-49, wherein a surface zone (130,131) of the composite extends from a longitudinal surface (105, 105') of the composite perpendicularly towards the interior (132) of the composite; and the surface zone comprises thickness of at least 10% of the thickness of the composite, when the thickness of the composite is less than 500 microns; or the surface zone comprises thickness of up to 200 microns.

51. A method according to any of preceding numbered items 33-50, further comprising orienting fiber components (100) in at least one surface zone (130, 131).

52. A method according to any of preceding numbered items 33-51, wherein the organic natural fiber material comprises fiber components; and wherein the composite comprises more oriented fiber components than fiber components substantially deviating from longitudinal orientation in at least one surface zone.

53. A method according to any of preceding numbered items 33-52, wherein the organic natural fiber material comprises fiber components, and wherein at least 80% of the fiber components in the vicinity of a surface of the composite are aligned along normal of the surface, such that rotation angle ($\beta 1$) around longitudinal dimension of the fiber components is less than 40 degrees.

54. A method according to any of preceding numbered items 33-53, wherein the matrix material comprises polymer matrix.

55. A method according to any of preceding numbered items 33-54, wherein the matrix material comprises plastic or thermoplastic.

56. A method according to any of preceding numbered items 33-55, wherein the composition comprises a specific modulus (tensile modulus divided by density) of at least 1900 MPa/g/cm$^3$.

57. A method according to any of preceding numbered items 33-56, wherein the organic natural fiber material comprises lignin under 15 percentage by weight; or under 5 percentage by weight; or under 1 percentage by weight; or under 0.5 percentage by weight.

58. A method according to any of preceding numbered items 33-57, wherein the composite (250) comprises absorbing properties at frequencies above 500 Hz, or at frequencies above 1000 Hz, at frequencies above 2000 Hz, or at frequencies above 3000 Hz, or at frequencies above 4000 Hz.

59. A method according to any of preceding numbered items 33-58, wherein modulus of elasticity of the component is selected by orientation of the fiber components in at least one surface zone.

60. A method according to any of preceding numbered items 33-59, wherein the matrix material is selected according to desired acoustic properties of the composite.

61. A method according to any of preceding numbered items 33-60, wherein amount of fiber comprised in the organic natural fiber material is selected according to desired acoustic properties of the composite.

62. A method according to any of preceding numbered items 33-61, wherein average length of original natural fiber material is selected according to desired acoustic properties of the composite.

63. A method according to any of preceding numbered items 33-62, wherein elastic modulus and/or loss coefficient of the composite are selected according to desired acoustic properties of the composite.

64. A method according to any of preceding numbered items 33-63, wherein thermal expansion coefficient of the composite is selected by chosen matrix material, amount of the fiber in the organic natural fiber material and orientation of the fiber.

65. Method for producing a composition according to any of numbered items 1-32.

66. Use of a composition according to any of numbered items 1-32, as acoustic material.

67. Use of a composition according to any of numbered items 1-32, wherein the composite material is used at least as part of a loudspeaker.

68. Use of a composition according to numbered item 67, wherein the composite material is used as a panel of a loudspeaker and/or as a cone of a loudspeaker.

69. Use of a composition according to any of numbered items 1-32, wherein the composite material is used at least as a part of a musical instrument.

70. Use of a composition according to any of numbered items 1-32, for attenuation of sound.

71. Use of a composition according to any of numbered items 1-32, for strengthening sound.

72. Use of a composition according to any of numbered items 1-32, as part of a vehicle for attenuating and/or damping sound.

73. A loudspeaker comprising the composition according to any of numbered items 1-32.

74. A sound absorbing panel comprising the composition according to any of numbered items 1-32.

75. An electric device comprising the composition according to any of numbered items 1-32.

76. A musical instrument comprising the composition according to any of numbered items 1-32.

77. A building block comprising the composition according to any of numbered items 1-32.

The invention claimed is:

1. A composite comprising a melt flow direction, the composite comprising thermoplastic polymer matrix material, and fiber components with a hollow interior, wherein the fiber components are chemically treated particles of organic natural fiber material comprising cellulose from kraft process, wherein at least part of the fiber components in the composite have been oriented substantially parallel with a direction of the melt flow, such that the speed of sound in a direction perpendicular to the melt flow is at least 10% less than in a direction of the melt flow.

2. The composite according to claim 1, wherein the speed of sound is below 1800 m/s in at least one direction in the composition.

3. The composite according to claim 1, wherein ratio of the speed of sound in the direction of the melt flow to the speed of sound in the direction perpendicular to the melt flow is between 3:1 and 9:1.

4. The composite according to claim 1, wherein at least 80% of the fiber components comprise an averaged deviation angle less than 40 degrees at a direction of a melt flow of the composite.

5. The composite according to claim 1, wherein the fiber components comprise a longitudinal dimension, a horizontal dimension and a vertical dimension, and wherein at least 60% of the fiber components have a shape ratio of the longitudinal dimension to the vertical dimension of at least 4 to 1; or at least 10:1.

6. The composite according to claim 1, wherein the fiber components comprise polymer structures of cellulose material.

7. The composite according to claim 1, wherein a surface zone of the composite extends from a longitudinal surface of the composite perpendicularly towards the interior of the composite; and the surface zone comprises thickness of at least 10% of the thickness of the composite, when the thickness of the composite is less than 500 microns; or the surface zone comprises thickness of up to 200 microns.

8. The composite according to claim 1, wherein at least 80% of the fiber components in the vicinity of a surface of the composite are aligned along normal of the surface, such that rotation angle around longitudinal dimension of the fiber components is less than 40 degrees.

9. The composite according to claim 1, wherein the organic natural fiber material comprises lignin under 15 percentage by weight; or under 5 percentage by weight; or under 1 percentage by weight; or under 0.5 percentage by weight.

10. A method for manufacturing a composite having a melt flow direction, the method comprising:

providing thermoplastic polymer matrix material and providing fiber components with a hollow interior, wherein the fiber components are chemically treated particles of organic natural fiber material comprising cellulose from kraft process, introducing a mixture comprising said thermoplastic polymer matrix material and said fiber components as a melt, and forming a composite structure, wherein at least part of the fiber components in the composite have been oriented substantially parallel with the direction of the melt flow, such that the speed of sound in a direction perpendicular to the melt flow is at least 10% less than in a direction of the melt flow.

11. The method according to claim 10, wherein the speed of sound is below 1800 m/s in at least one direction in the composition.

12. The method according to claim 10, wherein ratio of the speed of sound in the direction of the melt flow to the speed of sound in the direction perpendicular to the melt flow is between 3:1 and 9:1.

13. The method according to claim 10, wherein at least 80% of the fiber components comprise an averaged deviation angle less than 40 degrees at a direction of a melt flow of the composite.

14. The method according to claim 10, wherein the fiber components comprise a longitudinal dimension, a horizontal dimension and a vertical dimension, and wherein at least 60% of the fiber components have a shape ratio of the longitudinal dimension to the vertical dimension of at least 4 to 1; or at least 10:1.

15. The method according to claim 10, wherein the fiber components comprise polymer structures of cellulose material.

16. The method according to claim 10, wherein a surface zone of the composite extends from a longitudinal surface of the composite perpendicularly towards the interior of the composite; and the surface zone comprises thickness of at least 10% of the thickness of the composite, when the thickness of the composite is less than 500 microns; or the surface zone comprises thickness of up to 200 microns.

17. The method according to claim 10, wherein at least 80% of the fiber components in the vicinity of a surface of the composite are aligned along normal of the surface, such that rotation angle around longitudinal dimension of the fiber components is less than 40 degrees.

18. The method according to claim 10, wherein the organic natural fiber material comprises lignin under 15 percentage by weight; or under 5 percentage by weight; or under 1 percentage by weight; or under 0.5 percentage by weight.

19. A loudspeaker comprising the composite according to claim 1.

20. A musical instrument comprising the composite according to claim 1.

* * * * *